(12) United States Patent
Beckmann et al.

(10) Patent No.: US 7,788,212 B2
(45) Date of Patent: Aug. 31, 2010

(54) SYSTEM AND METHOD FOR PERSONALIZATION IMPLEMENTED ON MULTIPLE NETWORKS AND MULTIPLE INTERFACES

(75) Inventors: William H. Beckmann, Cross River, NY (US); Diana F. Kuhl, Darien, CT (US); Gerard E. Philipp, Poughkeepsie, NY (US)

(73) Assignee: Big Think LLC, New York, NY (US)

( * ) Notice: Subject to any disclaimer, the term of this patent is extended or adjusted under 35 U.S.C. 154(b) by 2200 days.

(21) Appl. No.: 09/946,157

(22) Filed: Sep. 4, 2001

(65) Prior Publication Data

US 2002/0073088 A1 Jun. 13, 2002

Related U.S. Application Data

(60) Provisional application No. 60/230,544, filed on Sep. 5, 2000.

(51) Int. Cl.
G06F 17/00 (2006.01)
G06F 17/30 (2006.01)

(52) U.S. Cl. .................. 707/102; 705/26; 717/100; 717/101; 717/120; 715/201

(58) Field of Classification Search ............ 705/26–27, 705/59, 51, 28, 30; 709/219, 230, 226; 707/999.01, 707/E17.109, 102; 717/101, 120
See application file for complete search history.

(56) References Cited

U.S. PATENT DOCUMENTS

| 5,724,567 | A | | 3/1998 | Rose |
| 5,754,939 | A | | 5/1998 | Herz |
| 5,758,257 | A | | 5/1998 | Herz |
| 5,774,357 | A | | 6/1998 | Hoffberg |
| 5,862,223 | A | * | 1/1999 | Walker et al. ................. 705/26 |
| 5,867,386 | A | | 2/1999 | Hoffberg |
| 5,867,494 | A | * | 2/1999 | Krishnaswamy et al. ...... 705/26 |
| 5,867,799 | A | | 2/1999 | Lang et al. |
| 5,875,108 | A | | 2/1999 | Hoffberg |
| 5,901,246 | A | | 5/1999 | Hoffberg |
| 5,903,454 | A | | 5/1999 | Hoffberg |
| 5,907,704 | A | * | 5/1999 | Gudmundson et al. ...... 717/100 |
| 5,917,912 | A | | 6/1999 | Ginter et al. |
| 5,920,477 | A | | 7/1999 | Hoffberg |
| 5,999,525 | A | * | 12/1999 | Krishnaswamy et al. ...... 705/26 |
| 6,081,750 | A | | 6/2000 | Hoffberg |
| 6,089,453 | A | * | 7/2000 | Kayser et al. ................ 235/383 |
| 6,094,654 | A | * | 7/2000 | Van Huben et al. ............ 707/8 |
| 6,115,713 | A | * | 9/2000 | Pascucci et al. ................ 705/26 |
| 6,289,382 | B1 | * | 9/2001 | Bowman-Amuah .......... 705/26 |
| 6,363,411 | B1 | * | 3/2002 | Dugan et al. ................ 709/202 |

(Continued)

OTHER PUBLICATIONS

Featherly, Forrester to media: let go of that content, Newsbytes News Network, Jun. 1, 2000, 3 pages.*

(Continued)

*Primary Examiner*—Cuong H Nguyen
(74) *Attorney, Agent, or Firm*—Neifeld IP Law, PC

(57) ABSTRACT

Personalization of an interface with a network is facilitated through an application of a User Profile to Web page generation, information location, information retrieval, information presentation, and on-line commerce. Additionally, the User Profile may be continuously generated, maintained, and updated.

202 Claims, 15 Drawing Sheets

U.S. PATENT DOCUMENTS

| | | | |
|---|---|---|---|
| 6,368,177 B1* | 4/2002 | Gabai et al. | 705/26 |
| 6,400,996 B1 | 6/2002 | Hoffberg | |
| 6,418,424 B1 | 7/2002 | Hoffberg | |
| 6,425,005 B1* | 7/2002 | Dugan et al. | 709/223 |
| 6,640,145 B2 | 10/2003 | Hoffberg | |

OTHER PUBLICATIONS

Butterman, The (Fare) chase is on, Travel Agent, Apr. 30, 2001, 2 pages.*

From Business Wire, AOL chooses savage beast technologies to provide integrated music recommendation across AOL music's leading offerings, Feb. 26, 2003, 2 pages.*

P2P Directories for Distributed Web Search: From Each According to His Ability, to Each According to His Needs; M. Bender; S. Michel; G. Weikum; Data Engineering Workshops, 2006. Proceedings. 22nd International Conference on; Digital Object Identifier: 10.1109/ICDEW.2006.110; Publication Year: 2006, pp. 51-51.*

Advanced concepts for next generation portals; Zirpins, C.; Weinreich, H.; Bartelt, A.; Lamersdorf, W.; Database and Expert Systems Applications, 2001. Proceedings. 12th International Workshop on; Digital Object Identifier: 10.1109/DEXA.2001.953110; Publication Year: 2001, pp. 501-506.*

The design of SoftMan-based digital copyright protection system in internet; Fu-Cheng You; Cybernetics and Intelligent Systems, 2008 IEEE Conference on; Digital Object Identifier: 10.1109/ICCIS.2008.4670787; Publication Year: 2008, pp. 662-665.*

The Research of Digital Copyright Protecting Mechanisms Base on Mobile Agent and Digital Watermark; Fu Cheng You; Li Fan Zhang; New Trends in Information and Service Science, 2009. NISS '09. International Conference on; Digital Object Identifier: 10.1109/NISS.2009.10; Publication Year: 2009, pp. 466-469.*

Research on mobile agent-based digital watermark tracking system and communication security; Fu-Cheng You; Yang Li; Xu-Yan Tu; Wavelet Analysis and Pattern Recognition, 2007. ICWAPR '07. International Conference on; vol. 2; Digital Object Identifier: 10.1109/ICWAPR.2007.4420785 ;Publication Year: 2007, pp. 835-839.*

Secure P2P File Sharing System Based on Full-Text Retrieval;Wang, Long; Wan, Zhenkai; Information Science and Engineering (ICISE), 2009 1st International Conference on; Digital Object Identifier: 10.1109/ICISE.2009.1048; Publication Year: 2009, pp. 380-383.*

Application of Mobile Agent and Trusted Third Party on Digital Copyright Protecting in E-commerce; Fu Cheng You; Computer Science and Computational Technology, 2008. ISCSCT '08. International Symposium on; vol. 2; Digital Object Identifier: 10.1109/ISCSCT.2008.21; Publication Year: 2008, pp. 800-804.*

ITeS—Transcending the Traditional Service Model; Jyh-sheng Ke; e-Business Engineering, 2006. ICEBE '06. IEEE International Conference on; Digital Object Identifier: 10.1109/ICEBE.2006.66; Publication Year: 2006, pp. 2-2.*

An fast integrated searching strategy and application in multi-source massive image database for Disaster Mitigation and Relief Jian Zhang; Xiaoling Chen; Xiaobin Cai; Biyu Chen; Jianzhong Lu; Wei Wu; Xubin Yang; Geoscience and Remote Sensing Symposium, 2007. IGARSS 2007. IEEE International; Digital Object Identifier: 10.1109/IGARSS.2007.442392.*

A Method for Distributed Personal Contents Management; Moonyoung Chung; Sungjoo Kang; Ji Hoon Choi; Kyong-I Ku; Won-Young Kim; Wan Choi; Advanced Communication Technology, 2008. ICACT 2008. 10th International Conference on; vol. 1 Digital Object Identifier: 10.1109/ICACT.2008.4493878; Publication Year: 2008, pp. 808-811.*

OpenGIS WMS implementation and its integrated application using ASP.NET; Zhenguo Qian; Pancheng Wang; Liqiang Zhang; Chongjun Yang; Geoscience and Remote Sensing Symposium, 2004. IGARSS '04. Proceedings. 2004 IEEE International vol. 5; Digital Object Identifier: 10.1109/IGARSS.2004.1370314; Publication Year: 2004, pp. 2953-2956 vol. 5.*

An Interoperable Transportation Framework Data Service; Yang, C.P.; Bambacus, M.; Ying Cao; Kafatos, M.; Geoscience and Remote Sensing Symposium, 2006. IGARSS 2006. IEEE International Conference on; Digital Object Identifier: 10.1109/IGARSS.2006.64; Publication Year: 2006, pp. 233-236.*

New constructions and practical applications for private stream searching; Bethencourt, J.; Song, D.; Waters, B.; Security and Privacy, 2006 IEEE Symposium on; Digital Object Identifier: 10.1109/SP.2006.27; Publication Year: 2006, pp. 6 pp. 139.*

Algorithmic and architectural co-design of a motion-estimation engine for low-power video devices; De Vleeschouwer, C.; Nilsson, T.; Denolf, K.; Bormans, J.; Circuits and Systems for Video Technology, IEEE Transactions on; vol. 12, Issue: 12 Digital Object Identifier: 10.1109/TCSVT.2002.806810 ; Publication Year: 2002, pp. 1093-1105.*

Implementation of GSM based commercial automobile tracker using PIC 18F452 and development of Google Earth embedded monitoring software; Ali, J.; Nasim, S.; Ali, T.; Ahmed, N.; un Nabi, S.R.; Research and Development (SCOReD), 2009 IEEE Student Conference on; Digital Object Identifier: 10.1109/SCORED.2009.5443760; Publication Year: 2009.*

User-interaction supported data-retrieving engine for distributed multimedia presentations;Chun-Chuan Yang; Communications, 2001. ICC 2001. IEEE International Conference on;vol. 10;Digital Object Identifier: 10.1109/ICC.2001.937269; Publication Year: 2001, pp. 3244-3250 vol. 10.*

Written Opinion dated Feb. 10, 2003 of International Application No. PCT/US01/27367 (8 pages).

\* cited by examiner

Ex. PARTNER offers Interface Service

Interface System Database Creation and Updates

User Data Sources (example)

User Personalized Data (example)

Interface Serives Data (example)

Selection Assistance Process

Interface System Services & Selection Assistance Extensions
Peer Computing Software

SYSTEM AND METHOD FOR PERSONALIZATION IMPLEMENTED ON MULTIPLE NETWORKS AND MULTIPLE INTERFACES

RELATED APPLICATION

This application is based upon provisional application Ser. No. 60/230,544, entitled "System and Method for a Personalized Search Engine, Personalized Selection Shopping Assistance Shopping System and Personalized Web Page Auto-Generation System," filed on Sep. 5, 2000 for William H. Beckmann, Diana Kuhl Phelps, and Gerard E. Philipp. The contents of this provisional application are fully incorporated herein by reference.

FIELD OF THE INVENTION

The present invention relates to a system and method for increasing the productivity, ease, and naturality a user experiences in identifying, finding and buying needed or desired goods or services, primarily over or through various networks and network interfaces. More particularly, the invention relates to a system and method for: personalizing a network interface such as through an application of a User Profile to Web page generation for the Internet; locating information; retrieving information; presenting information; and facilitating on-line commerce. Additionally, the present invention relates to the generation, maintenance, and evolution of information relevant to habits, behaviors, and preferences of the consumer that impact buying decisions and transactions. The system and method are sensitive to privacy issues, concerns, and regulations and are fully flexible insofar as generation and distribution of such information are concerned. As an example, a user may be a consumer, who wishes to conduct commerce.

BACKGROUND OF THE INVENTION

Today's Internet is populated by millions of users, each having access to hundreds of millions of "pages" of content over the World Wide Web (WWW). Vendors offering millions of on-line products and services also populate the Internet. With so much available information, and with so many products and services available on-line, it is becoming increasingly difficult for users to find information that best suits their needs. Two fundamental challenges occur. The first challenge is to extract from users their actual needs or objectives. The second challenge is to create a sufficiently detailed search of available information to locate goods or services that fulfill those needs or objectives, and then to package that information in a way that is easily understood and acted upon by users.

A limitation of prior art search facilities on the Internet is their focus on the execution of the search, and not on either understanding the user's objectives in searching, or in helping the user to formulate a search request. Search facilities merely carry out the user's direct request, tabulate the results, and present all of these results to the user. These search facilities are limited in that they do not incorporate User Profiles in formulating multiple search requests or perform multi-dimensional analysis on the search results to determine the best match to the user's original request. Additionally, typical prior art systems present the user with search results in a tabular fashion, instead of in a well organized, intuitively integrated display.

Various search engines, such as those found at http://www.Yahoo.com and http://www.Excite.com, allow users to refine their Internet searches through the use of Boolean operators. In addition to Boolean searches, other new methods and systems have enabled users to refine their searches so that less unwanted information is presented.

However, despite these advances, even the most narrowly drawn user's search may still result in hundreds of "hits" or search results. The user must then investigate all of these results to determine which result best answers the user's search. As a result of this burden, the users often settles on results that are not the best available to satisfy their needs.

U.S. Pat. No. 6,041,326 entitled "Method and System in a Computer Network for an Intelligent Search Engine" describes a method and system for limiting a search engine based upon the preferences of a user. User-defined preferences are applied through a plug-in program to limit the scope of searches, so that less unwanted information is delivered to the user. A drawback of this approach is that only a single user query or search is affected. Additionally, these techniques do not utilize User Preferences to reformulate the user's search request into more efficient requests. Additionally, these techniques do not operate on the results of multiple, related searches.

Many on-line vendors, aware of the difficulties that a user faces in finding a desired product or service on-line, have sought to improve a user's purchasing experience through the analysis of purchasing patterns for individual users, and across multiple users. By using this analysis, the vendor is able to generate recommendations, and present these recommendations to a user guiding their searches. However, this approach is limited in that it is specific to a single vendor. This approach does not help the user select among alternative vendor offerings. Furthermore, these analyses do not incorporate well-known purchasing characteristics such as seasonal dependencies. This is at least partly due to lack of sufficient data because of reliance on online-only behavioral information.

Additionally, the above-described approach does not enable the user to easily combine related products or services from different vendors. As an example, consider the process of booking reservations for a trip. This process may include making airline reservations, booking a hotel room, renting a car, making meal reservations, or planning entertainment. Today, some vendors work together to enable users to search across their collective offerings. As an example, Websites, such as http://www.Buy.com allow a user to book airline, hotel, and car rental reservations, offered from several vendors, from the same site. However, even when vendors take this approach, the user's product choices are restricted to those of the participating vendors.

Finally, many on-line Internet Service Providers offer their users access to a storage space in which to store a Personal Web page. Though highly desired by most users, these Personal Web pages can be cumbersome to create. It is especially difficult for the vast number of users with limited computer knowledge. Furthermore, these Web pages are generally static, and do not reflect changing behavior patterns, or changes in the preferences of a user.

It is an object of the present invention to provide a system and method to employ User Preferences and behavior patterns to reformulate a user's search request into one or more related search requests, and to then analyze the results of these multiple searches to provide an optimal response to the user.

It is another object of the present invention to provide a system and method to enable users to improve the process of selecting among alternative vendors' offerings, and to streamline the process of purchasing related products.

It is a further object of the present invention to provide a system and method to permit the automatic generation of a personalized interface, based upon User Preferences, which can be continuously and automatically modified without direct user intervention. This personalized interface may be automatically re-configured to accommodate various types of networks, or network interface devices. In a preferred embodiment, this interface may be a Personalized Web page, a voice interface, or any personalized interface (such as a Personal Digital Assistant (PDA)) dependent upon the client device used and the network accessed.

SUMMARY OF THE INVENTION

These and other objects are realized by the present invention. The present invention acts as a focal point for information search, retrieval, and presentation rather than as a mere gatherer and presenter of lists of Universal Resource Locator (URL) links.

In a preferred embodiment of the present invention, a system for searching for information, for presenting results, and for facilitating the selection and purchase of products and services over the Internet, through the application of expert knowledge technology and multi-dimensional analysis of a User Profile, is disclosed. A system is also disclosed for the on-line interactive generation of Personal Web pages.

The present invention may include one or more User Profile Databases containing user information. This information may include User Preferences, User Behavior, and a User Profile.

User Preferences are obtained directly from the user. As an example, this information can be obtained through the completion of a survey or questionnaire. These preferences contain data on what users think that they like or what limitations or restrictions or conditions they think apply to purchase of goods and services.

User Behavior information is comprised of data on what the user has actually done. As an example, User Behavior data may include past purchasing activity, or information on frequently visited sites. The User Behavior information may include data on both on-line and off-line activities.

User Characteristics information is a list of user qualities. These qualities can be generated from both on-line and off-line sources. In one embodiment of the present invention, the user is given the chance to review and approve the information contained in the user's characteristics data.

Through the completion of one or more simple and intuitive forms, the user may initiate a search request, or request the construction of a Personal Web page. The present invention uses various behavioral and purchasing information to interact with the user and ensure that a search request accurately encapsulates what is needed or desired by the user.

Applications software acts on the user's search request, modifying the search through the application of relevant data, such as User Preferences, User Profile, and behavioral data. The present invention reformats a user's search request into queries that are more efficient, more effective, and more comprehensive for execution. Templates defining the appropriate format for information, or for product or service searches are generated and stored by the invention. The invention retrieves the appropriate templates as needed for the searches it generates. One or more on-line information, product, or services searches may be generated by the invention for each user request.

The present invention receives the results of its searches and incorporates expert judgment and multi-dimensional analysis to determine a preferred match between the user's original request and the results of the searches.

Illustratively, the results of these searches are sent to a software system that designs a total response for the user. The total response is then forwarded to the user.

The present invention may also employ templates to generate a Personal Web page. This Web page may be used to personalize either the entry of a search, or the display of search results.

Accordingly, the inventive system and method:

Analyzes User Preferences and User Behavior, and incorporates the results of this analysis into a User Profile Database. This User Profile Database is used to improve the effectiveness of a user's network search query. Additionally, the User Profile Database is employed to generate multiple searches for the user, resulting in more responses to the users requests;

Interacts with the user, and the User Profile Database, to create a request that accurately and efficiently encapsulates a user's objectives;

Applies multi-dimensional analysis and expert systems to develop an optimum response to the user's request; and Analyzes the User Profile Database to drive the automatic design, generation, and updating of Personal Web pages.

BRIEF DESCRIPTION OF THE DRAWINGS

The following detailed description, given by way of example and not intended to limit the present invention solely thereto, will best be understood in conjunction with the accompanying drawings, in which.

DETAILED DESCRIPTION OF THE PREFERRED EMBODIMENTS

In a preferred embodiment of the present invention a system is disclosed whereby user searches, search results, and a user interface may be modified by an application of user information. This application results in a personalized networking experience.

Figure 1:
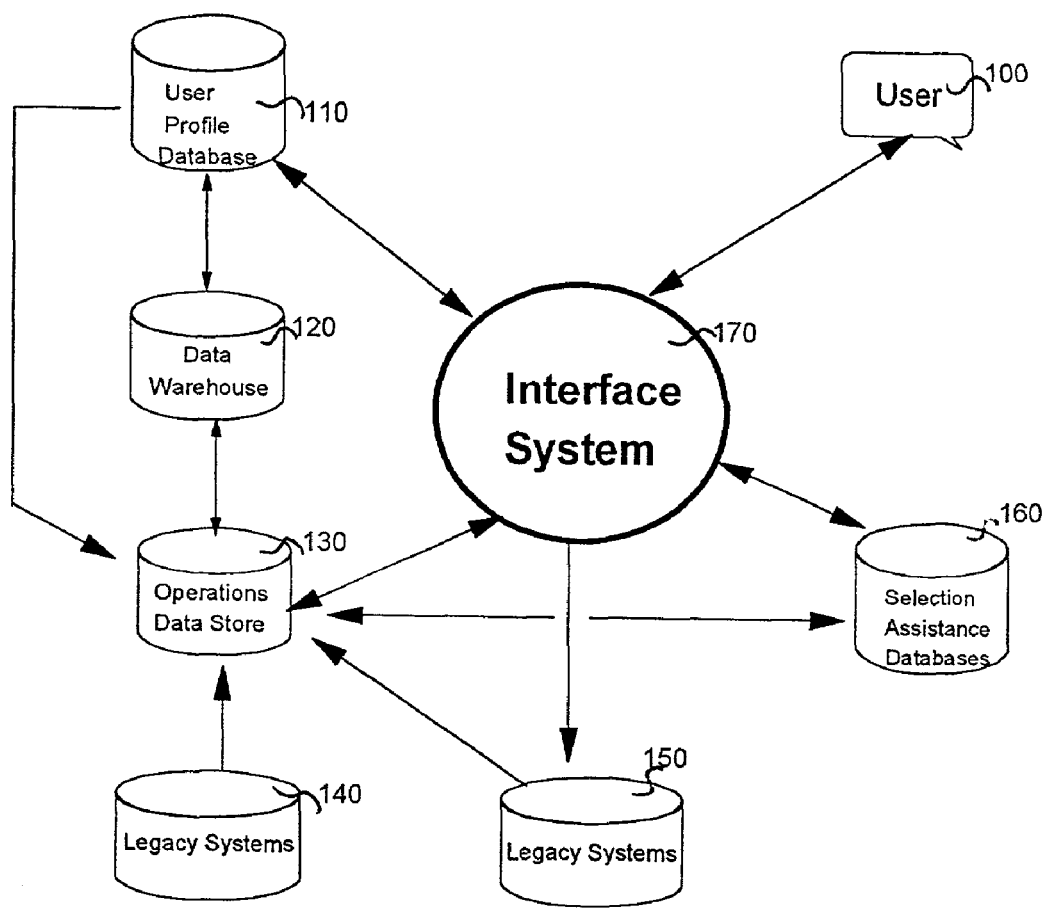
FIG. 1 illustrates an example of a preferred implementation in accordance with the present invention.

FIG. 1 is a block diagram showing the client-server architecture for the present invention. The user 100 represents an individual with a personal computer intelligent workstation, minicomputer, Personal Digital Assistant (PDA) or any other device or appliance that can access networks, such as the Internet, through which information, products, and services can be accessed, reviewed, or purchased. Illustratively, the user 100 may access the inventive personalized intuitive interface system (hereinafter "Interface" or "Interface System") 170 through a Website. The user 100 may navigate this Website through the use of Web browser software. Known Web browser software includes Netscape Navigator, Microsoft Internet Explorer, and Mosaic. Alternatively, the user may employ an Interface-specific desktop software application that serves to facilitate a connection to the Interface System 170.

The Interface System 170 may be implemented on a server containing software that redefines user search requests, analyzes the results of search requests, and presents recommendations based upon these results. The Interface System 170 is supported in achieving this result through access to a User Profile Database 110, a Data Warehouse 120, an Operations Data Store 130, a Selection Assistance Database, and Legacy Systems 140 and 150.

The Data Warehouse 120 contains existing information about a customer's past purchases, searches, information, product information, and the like. The Data Warehouse 120 may contain a pre-existing collection of data collected by a merchant or financial corporation who agrees to allow the Interface System to access this data. Illustratively, the Data Warehouse 120, and access to the data contained within may be implemented through software sold by Oracle, IBM, EMC, or Sun Microsystems.

The Operations Data Store 130 contains information about services that the invention deems important to store locally. It acts as a control point and as a front end to other databases. The Operations Data Store 130 is useful in managing content that constantly changes or is constantly accessed, and in situations having a higher performance requirement than can be provided by other system databases. The Operations Data Store 130 may be a database system that is geographically and logically distributed for purposes of redundancy, availability, and performance.

The Selection Assistance Database 160 contains templates. This database facilitates the analysis and presentation of multiple search results.

Legacy Systems Databases 140 and 150 are existing systems such as records on partner customers, merchant information, applications information, approval information, or prior preferences. These databases may belong to "partners" of the Interface System. An Interface partner may be a financial entity, merchant or other business that either agrees to provide the Interface System with access to user data or has otherwise integrated aspects of their business or infra structure into the Interface System.

These databases 140, 150 may contain information on the Interface System's User's activities maintained by a corporate partner of the Interface System. These databases may also contain information required by the Interface System for its operations. When this is the case, the Interface System will design its interface to ensure compatibility.

The User Profile Database 110 contains information on User Preferences, User Behavior, and other information derived from these information subsets through data analysis, data mining, and other data generation tools and techniques. The User Profile Database may be initially populated through the analysis of an Interface registration application. The registration process collects information that will be needed by the User Profile to support the functionalities of the Interface Service. The Interface System may use a commercially available Profile Builder, and customize that product for its applications. In addition to the registration information, prior and current shopping transactions will be analyzed to further develop the behavioral information.

Figure 2:
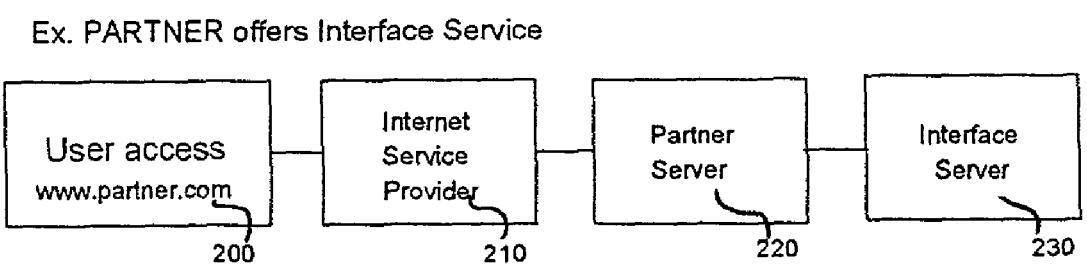
FIG. 2 illustrates an example of one method of accessing the inventive Interface System in accordance with the present invention.

FIG. 2 illustrates an exemplary access path to the Interface System. As an example, a user may use a personal computer, or other networking device, containing a Web browser to access the URL of a known Web site 200. This Website may be the site of a partner of the Interface System. This access may occur through an Internet Service Provider ("ISP") 210. Through the user's ISP, the user can access the server of this partner 220 corresponding to the known URL. From this server, the user may select an Interface Icon and/or otherwise be rerouted to an Interface Server 230.

Figure 3:
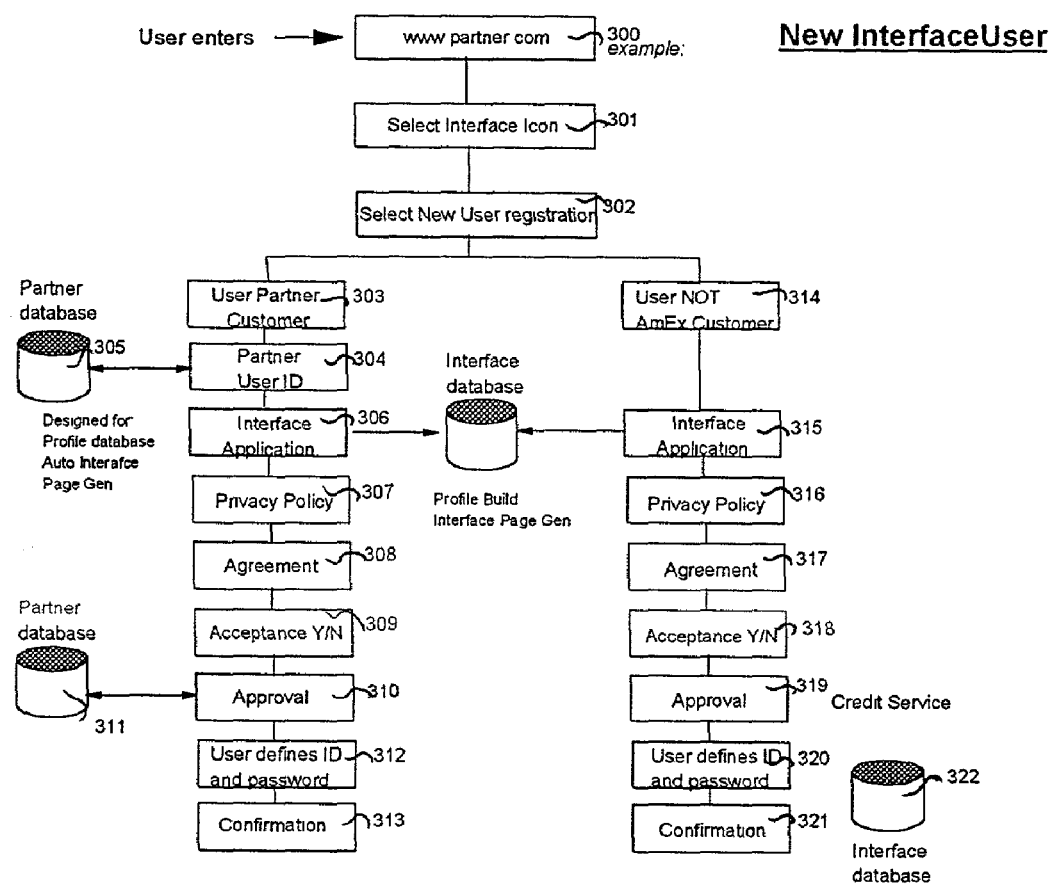
FIG. 3 is an example of the Interface System's New User registration process in accordance with the present invention.

As the Interface System facilitates a networking experience personalized to an individual, it is desirable for a User to engage in a registration process before his first use of the system. FIG. 3 illustrates an exemplary registration process. Continuing with the prior example, from the Interface Server 230, the User can access the Interface System for the first time through a known URL of an Interface partner 300. After selecting the Interface Icon 301, the user may be prompted to enter the new user registration System 302. Once inside the registration process, the user may proceed down one of two registration paths.

The Interface System registration process is designed to be complementary to the Interface partner's existing systems and databases. In keeping with this design, if a user is already the customer of an Interface partner 303, then the user will proceed down a first registration path. First, the user may enter identification corresponding to an ID 304 maintained by the Interface Partner. This ID facilitates the access of the Interface System to user data pre-existing in the Interface Partners databases 305. The user will then complete the Interface Application forms 306. The Interface System will then proceed to generate a User Profile Database and Web Page 323, based upon available data. To complete the registration process, the user may be presented with the Interface Privacy Policy 307 and a chance to signify the user's agreement 308. Once again the Partners database 311 will be accessed to determine if the user is eligible for the Interface Service. If the User is approved to access the Interface System 310 the user will be allowed to define an ID and password 312 for use in accessing the Interface System. Finally, the user may receive a confirmation of registration 313.

If the user is not a customer of an Interface Partner, the user will proceed down a second registration path. After completing the Interface Application 306, the Interface System will generate a User Profile Database and Web Page 323, based upon available data. The user may be presented with the Interface Privacy Policy 316 and a chance to signify the user's agreement 317. If the User is approved to access the Interface System 319, then the user will be allowed to define an ID and password 312 for use in accessing of the Interface System. Finally, the user may receive a confirmation of his registration 321.

It is at this time that the user may be allowed to download a desktop Interface application, designed to facilitate future access to the Interface System.

Figure 4:
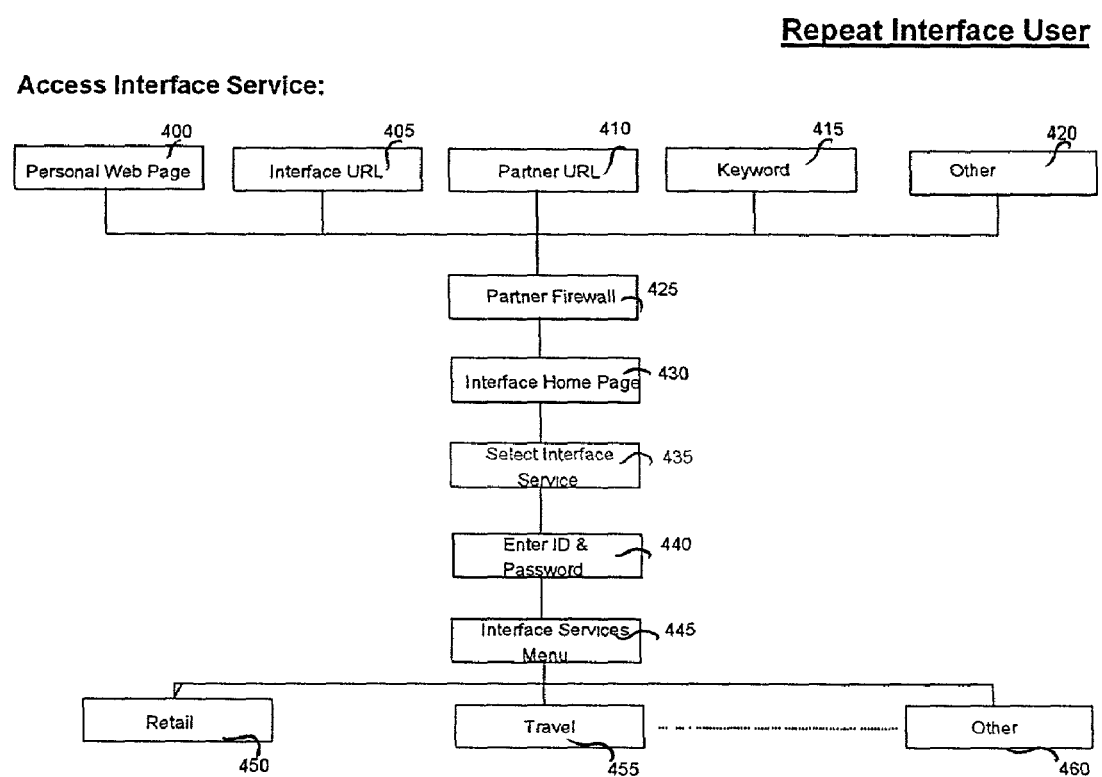
FIG. 4 is an example of a repeat user's Interface log-on procedure in accordance with the present invention.

Once the user has completed the initial registration process the user can log on to the Interface System as a repeat user. As shown in FIG. 4, the user may be able to access the Interface System through multiple access points, such as a Personal Web Page 400, an Interface URL 405, a Partner's URL 410, a Keyword 415, or another access source 420. After the User's computer and network connection has completed an authentication/ validation procedure, the user may be allowed to proceed past the firewall 425 to the Interface Home Page 430. From this home page, the user can choose to access the Interface Service 435. After entering an ID and password confirming the User's Identity 440, the User may be allowed to access a menu of available services 445. As examples, these services may include retail specific searches 450, travel specific searches, 455 or other available services, such as a general non-content specific search capability.

Figure 5:
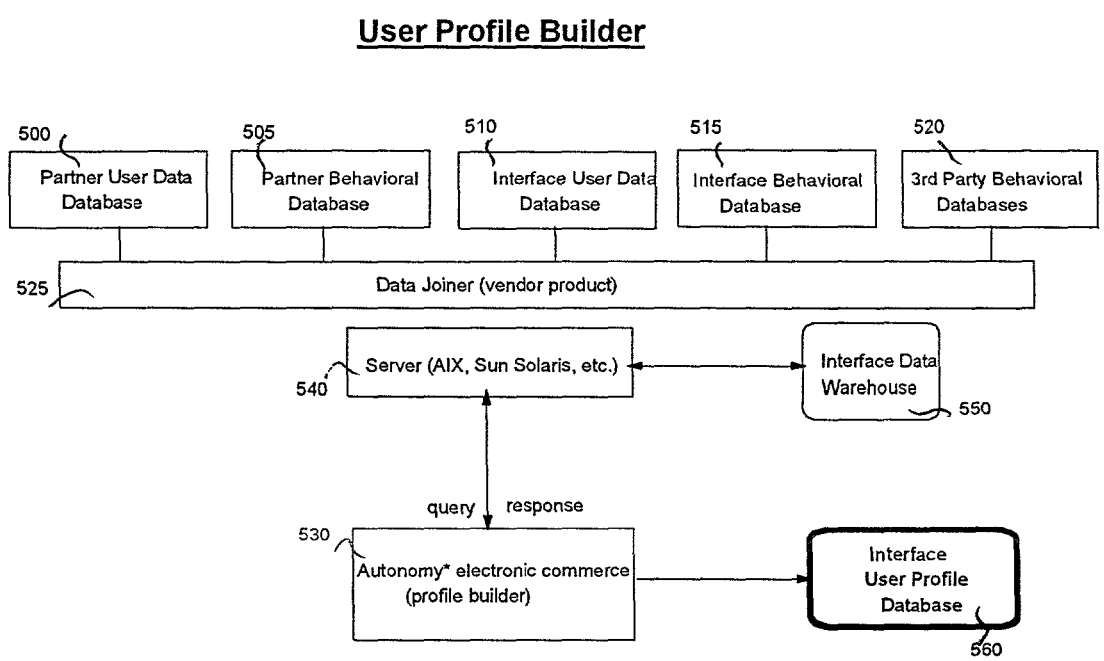
FIG. 5 illustrates one embodiment of the User Profile Database Builder in accordance with the present invention.

The Interface System utilizes a profile builder to develop a comprehensive User Profile Database for each user. As stated above, the User Profile Database is used by the Interface System to personalize the User's networking experience. The creation of the User Profile Database may begin during the new-user registration process. During the process of preparing the User Profile Database, data sources both internal and external to the Interface System may be accessed, and processed, to provide a complete analysis of the User. FIG. 5 illustrates an example of the initial creation of the User Profile from multiple data sources. A Data Joiner 525, Server 540, and E-commerce Builder Software 530 are operative to process data from multiple sources to generate a User Profile Database 560. These multiple sources may include a Partner User Database 500, a Partner Behavioral Database 505, an Interface User Database 510, an Interface Behavioral database 515, a Third Party Behavioral Database, 520, an Interface Data Warehouse 550, or a similar data source.

Figure 6:
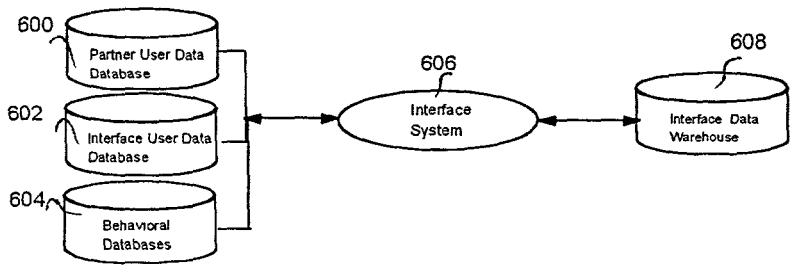
FIG. 6 illustrates an embodiment for the creation and update of Interface databases in accordance with the present invention.
Figure 6:
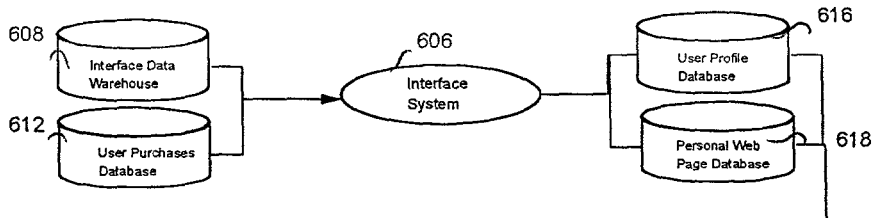
Figure 6:
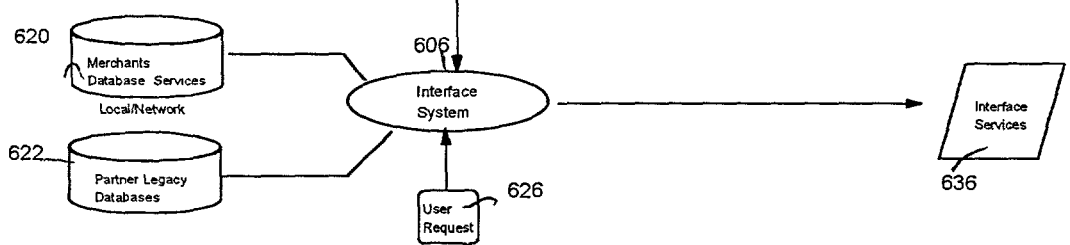

The Interface personalization process may continue long after the initial creation of the User Profile Database. Through the monitoring of events, the Interface User Profile Database can evolve, enhancing the Interface's knowledge of the user. FIG. 6 shows sample architecture for updating the Interface User Profile Database.

The Interface System utilizes both static, and dynamic data sources. Dynamic data sources are sources that update their data in response to events. Dynamic data sources are indicated in FIG. 6 by a "•".

Data from Partner User Databases 600, Interface User Databases 602, and Behavioral Databases 604 are continuously or periodically fed into the Interface System 606. This information is then stored in the Interface Data Warehouse 608.

Utilizing the changing content of the Interface Data Warehouse 608 and user purchase data fed into the User Purchases Database 612, the Interface System generates or updates the User Profile Database 616 and the Personal Web Page Database 618.

The current versions of the User Profile Database 616 and the Personal Web Page Database 618 are then utilized during the operation of the Interface System 606.

Upon receiving a user request 626, the Interface System provides Services 632 through the access of a Merchant's database 620 and Partners database 622. This database contains data on the products or services a particular Merchant offers. This data may change over time, as the services or products offered by a Merchant change. The Interface System may also make use of static legacy databases maintained by the Interface System or its partners.

2nd Embodiment—Automatic Web Page Generation

In another embodiment, the Interface System further personalizes a user's networking experience through the transformation of knowledge gained in interpreting user information and transaction information to create a Personalized Web page that is unique to the User. This automatic generation and design incorporates such languages as HTML, Java Script, XML, and the like. In one embodiment of the present invention, the generation of the Personal Web Page is a rules driven system that automatically designs a Personal Web page without the intervention of an actual Web Page designer during the process.

This Personal Web page may serve as an input interface, or as an output interface to the Interface System. Additionally, this Web page may serve as a platform for the delivery of recommendations to the user. A recommendation is a suggestion generated by the Interface System, based on the System's knowledge of the user. These recommendations may be pre-generated and stored in an Interface Warehouse based on information already known about a user, or may be generated dynamically based upon the Interface System's evolving knowledge of the user.

Recommendations may be delivered to the user spontaneously or in response to a user search. In one example, these recommendations may be "pushed"onto the user's Web page from the Interface Server. Additionally, the Interface System may "push" additional content to the user Web page, that the Interface System has determined may be of interest to the user. This content may include advertisements, news, and the like.

Figure 7:
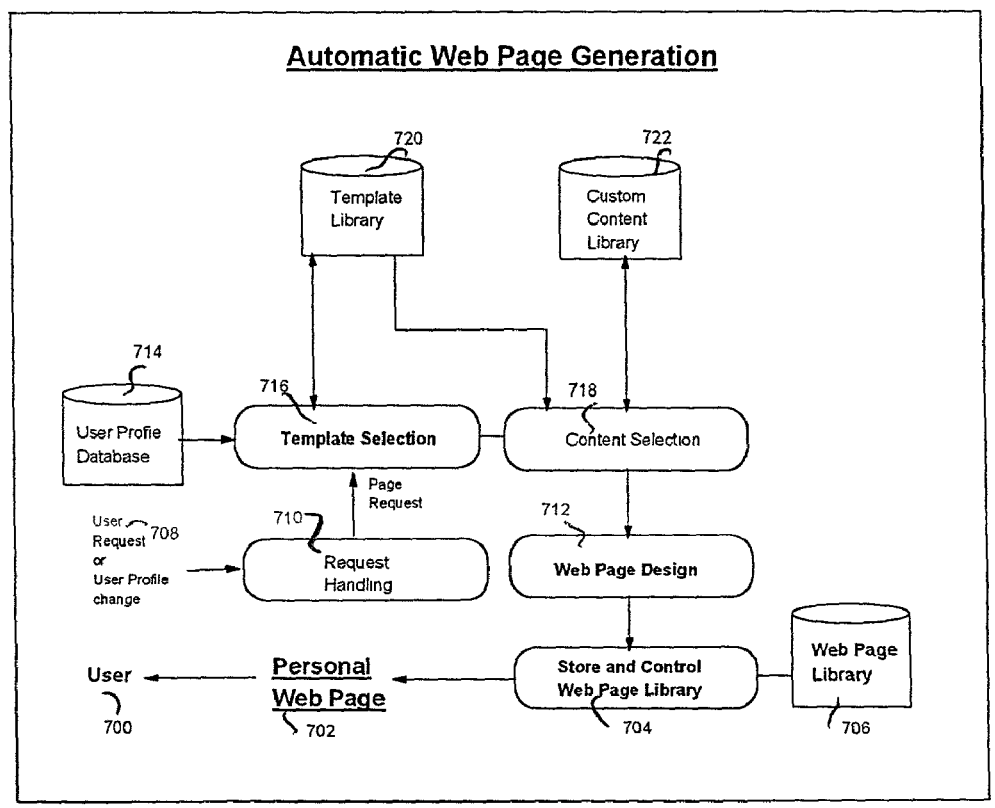
FIG. 7 illustrates an embodiment supporting the automatic generation of Web pages in accordance with the present invention.

FIG. 7 is a block diagram of an architecture that can be utilized in accordance with the system and method for generating Personal Web pages of the present invention. The process commences when the Template Selection Software 716 receives notification that a request is pending. The Template Selection Software 716 initiates a search to retrieve user data from the User Profile Database 714.

A core element of the Automatic Web Page generation is the information contained in the User Profile Database 714. As discussed above, the User Profile Database may contain data on the User Profile, User Preferences, and User Behavior. This information will be applied by vendor-supplied Intelligent Agent Software, Knowledge Management Software, and Analysis Software products. These products may be customized by the Interface System and applied to decide on a template design and content that best matches the Users.

In addition, there are two other databases located at the back-end of the process. The Template Library Database 720 contains the Interface designed Web Page Templates that convey the desired image of the Interface Service. These templates are structured to ensure the flexibility needed to satisfy the varied User Preferences. The template design may include a GUI tailored to the Interface Service and not normally seen on the Internet.

The Template Library Database 720 includes reserved areas for the addition of user appearance preferences. These appearance preferences relate to the look and feel of the users personalized interface, such as the Personal Web Page. These preferences are stored in the Custom Content Library 722. The Custom Content Library 722 may contain icons, images, animation, banners, audio, and the like. In one embodiment, the Interface System may provide an interface to allow the User to add data directly to this Custom Content Library 722. Using this method, the Custom Content Library 722 allows the Interface System to further personalize the Personal Web page by allowing the User to manually modify a generated page.

Following analysis, a template design is selected from the Template Library Database 720. The Template Selection Software 716 alerts the Content Selection Software 718 that an action is pending, and the Content Selection Software 718 brings in the template selected. The Content Selection Software 718 accesses the User Profile Database 714. The Content Selection Software 718 then uses preference information to select appropriate icons, animations, images, audio, and the like. The selected content, and the template, are then sent to the Web Page Design Software 712. In addition to the template and content, the appropriate Universal Resource Locator's (URL's) are also passed to the Web Page Design software 712. The final Personal Web page is stored in the Web Page Library Database 706 and preferably an email is automatically generated to notify the user 700 that the Personal Web Page 702 is complete. After access to the Interface system has been established, the user can select an icon on the desktop to access the Personal Web page 702.

The invention monitors the User Profile Database 714 and determines if changes in the data warrant a new Personal Web page. The process to update the Personal Web page 702 may be identical to the process to generate the initial Web page 702. In one embodiment, prior to any updating, the user will be notified of the recommended change. The user will then have the option of accepting or rejecting the changes to the Personal Web Page.

The Interface System may additionally have a Store and Control Web Page Library 704 controlling the management of the generated Web pages. The Store and Control Web Page Library 704 stores the Web pages in the Web Page Library 706 and notifies the User of the availability of the Personal Web Page.

The Interface System may automatically generate the Personal Web page for the user or may require a user request to initiate the generation.

3rd Embodiment: Multiple Targeted Interactive Internet Searches

Typically, a user wishing to locate information or services on the Internet will access an Internet search page. This search page could be a general search engine, such as http:/lwww-.Yahoo.com, or a more specialized content specific search engine, e.g., for travel, such as the one located at http://www.Expedia.com. One drawback to this technique is that in order to conduct a search, the user must first know of such an appropriate search page. In some cases, the user must know of separate search pages for each topic that the user may wish to search (i.e. a hotel page, a car reservation page, an airline page, and the like). Additionally, each page may require the user to format their searches differently, so that the user may need to reformat their searches each time they switch to a different page.

Typically, the data presented by these pages presents too many choices, for the average reader to be able to cull through them all, to select an optimum choice. Additionally, the specific search page may steer the user towards a less than optimum choice based on payments made to the search page by corporate partners of that page.

In order to produce the widest possible range of responses, the Interface System may generate multiple searches from a user's single search request. These multiple searches will then be output to multiple destinations. As each of these destinations may require a different search request format, the Interface System may re-format each of the multiple requests specifically for each destination. As examples, these destinations may be specific merchants, or individual vendors.

Figure 8:
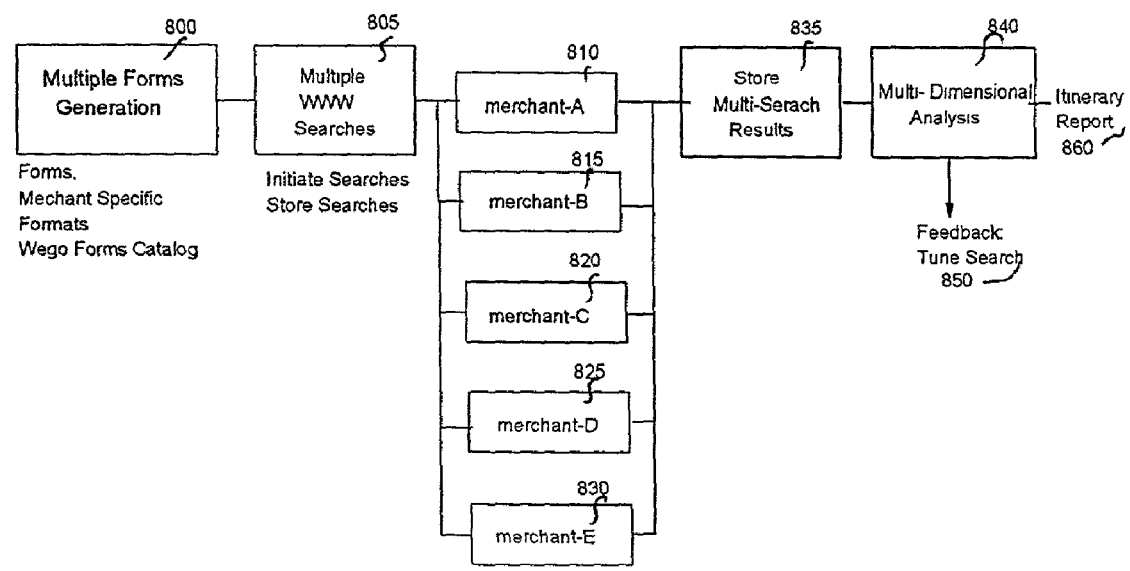
FIG. 8 illustrates the Interface System's multiple WWW search architecture in accordance with the present invention.

As shown in FIG. 8, the Users request is processed through the Multiple Forms Generator 800 to generate Multiple WWW Searches 805 that are each formatted specifically for a particular destination. These multiple searches are then transmitted to a plurality of destinations. In this example, these destinations are Merchants 810, 815, 825, and 830. Each of these destinations may transmit a response to this request back to the Interface System. The Interface System receives these requests and stores them 835. These stored results are then processed through a Multi-Dimensional Analysis. The results of this processing may either be a feedback request 850 to the Merchants 810, 815, 820, 825, and 830 to fine-tune a search or a report 860. This report presents the results of this process to the User.

Figure 9:
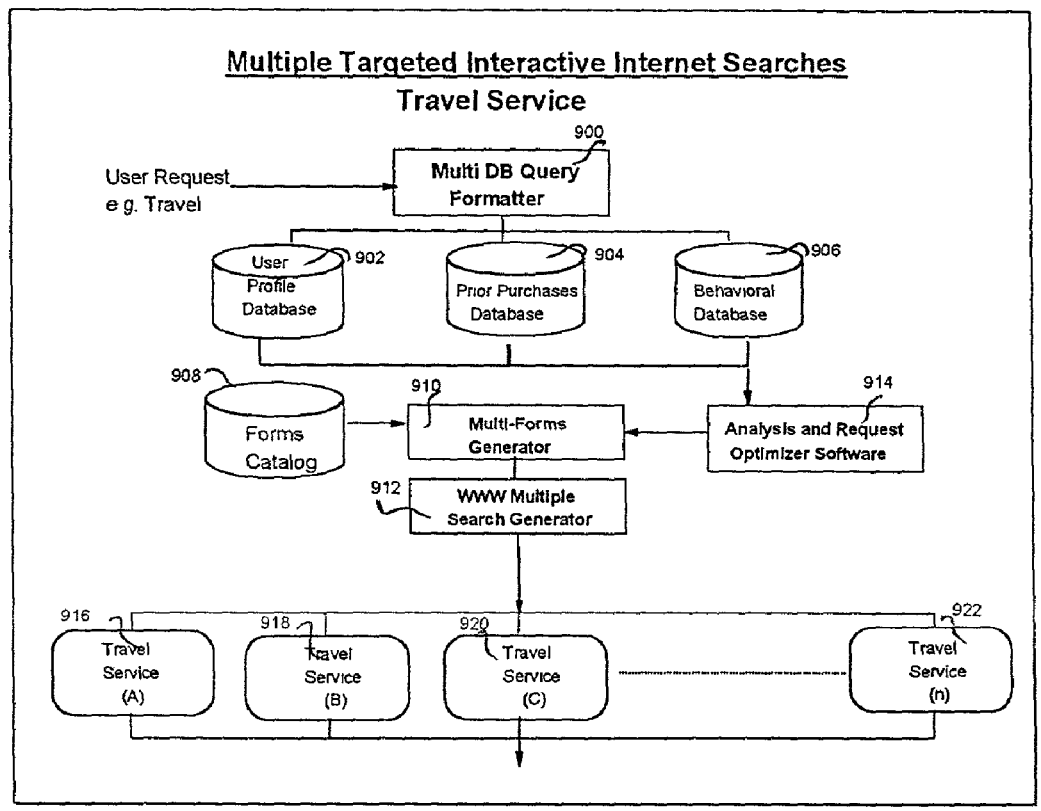
FIG. 9 illustrates an embodiment for Multiple Targeted Interactive Internet Searches in accordance with the present invention.

As an example, a user may wish to search the Internet for information pertaining to travel. Once this information is received, the user may then wish to use the Internet to make reservations, purchase tickets, and the like. FIG. 9 illustrates the architecture for an embodiment of the invention related to travel services.

In the specific example of travel services, the user is guided through the completion of several forms that identify the desired parameters of the user's travel itinerary. Once completed, the Multi DB Query Formatter 900 designs one or more search queries in a format acceptable to the appropriate service providers for that type of service (e.g., airline, hotel, and car rental reservation systems). The Analysis and Request Optimizer Software 914 retrieves data from the User Profile Database, Behavioral Database 906, and/or Prior Purchases Database 904 and applies Intelligent Agent software, Knowledge Management, predictive modeling, and the like, to structure a search query that will result in accurate search results for the user. These optimized searches are output to the Multi-Forms Generator 910, which places the request into appropriate search forms based upon templates stored in the Forms Catalog 908. The re-formatted searches are then sent to the WWW Multiple Search Generator where they are output to a plurality of Travel Services 916, 918, 920, and 922.

4th Embodiment: Selection Assistance Templates and Multiple Search Results

In another embodiment, the present invention receives the results of the multiple searches generated above, and assists the user in selecting a result that is optimum for that user through an application of the data contained in the User Profile Database.

Figure 10:
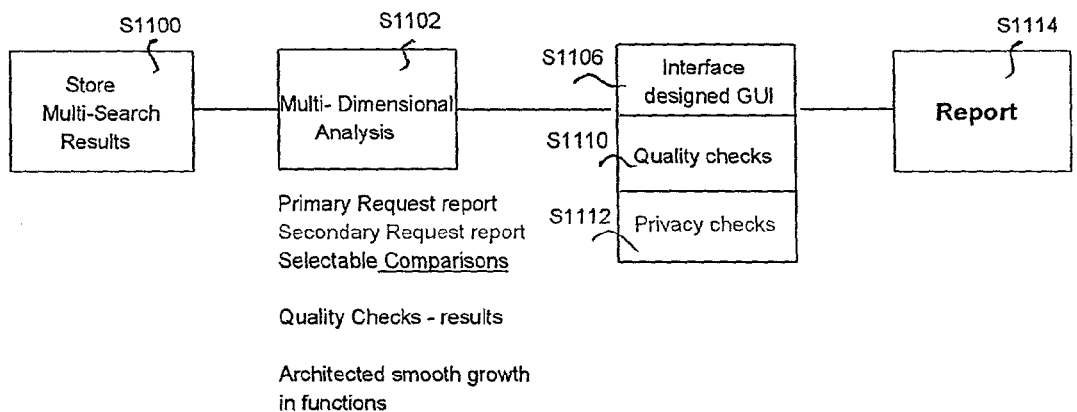
FIG. 10 illustrates the selection assistance process in accordance with the present invention.

As shown in the flowchart of FIG. 10, multiple search results are received from the network and stored in Step 11. Using available data contained in the Interface System's databases, the Interface System may conduct a Multi-Dimensional Analysis on the search results, in Step 1102, to determine an optimal response for the User.

Figure 11:
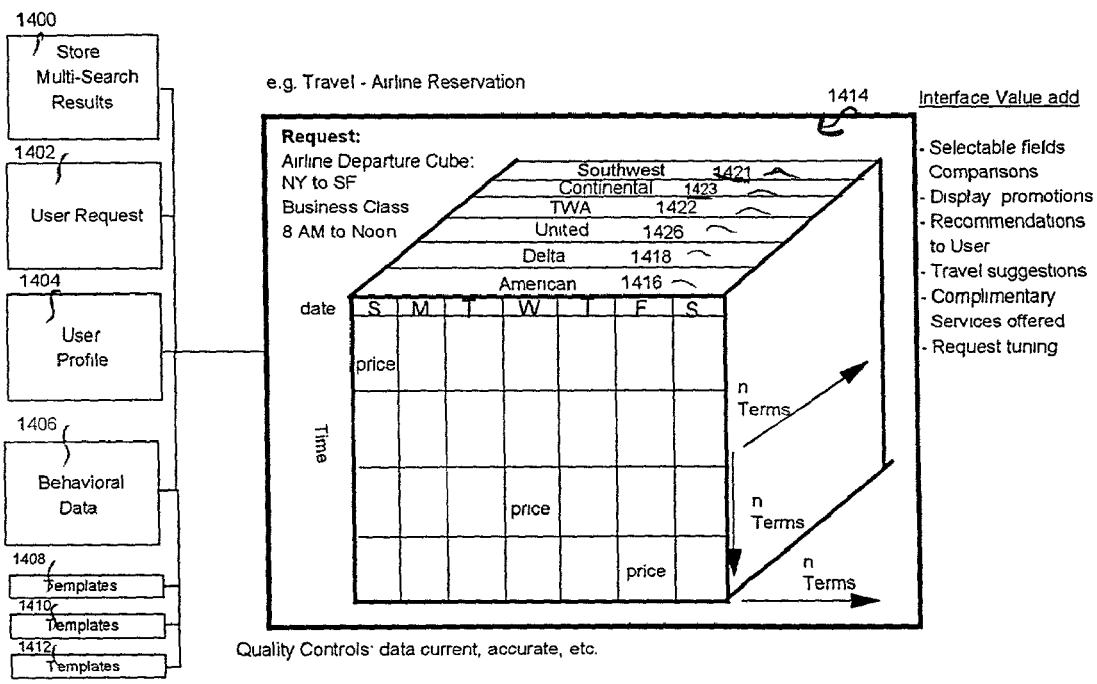
FIG. 11 shows an example of Multidimensional Search Results and Analysis in accordance with the present invention.

As an example, assume that a user wishes to rent a car. The Interface System knows that the user prefers convertibles. The Interface System can format and output multiple searches for convertibles at all rental car businesses in a given area. When responses from the rental car companies are received, the Interface System conducts a Multi-dimensional Analysis to organize the responses and determine which offer from a car company is the best offer for the User. FIG. 11 illustrates an architecture for the multi-dimensional analysis of search results.

A Multi-Dimensional Analysis Server operates Multi-Dimensional Analysis software developed by the Interface System, and from vendors such as Pilot produced by Cognos, Inc. Data received from multiple network sources are stored by store 1400. The Interface System uses the User Request 1402, the User Profile Database 1404, and Behavioral Data 1406 to select a template from a plurality of available templates 1408, 1410, and 1412.

A template is selected from a plurality of available templates 1408, 1410, and 1412 to accommodate data structures received from the merchants and to support the multi-dimensional analysis of the data. The retrieved data will then be positioned in the retrieved templates.

These populated templates may then be assembled into three-dimensional 'cubes' 1414 for multi-dimensional analysis. The Cube 1414 is made-up of n-number of stacked populated templates 1416, 1418, 1420, 1422, 1424, and 1426. The multi-dimensional analysis may incorporate many of these three-dimensional cubes.

The creation of the cube may be dictated by parameters defining the order (i.e., placement) of templates in the 'Cube' 1414 such as a weight factor indicating the importance of particular results in this particular user request analysis.

As an example, the Cube 1414 in FIG. 11 pertains to airline reservations. A two-dimensional template has been selected to organize the retrieved cost data. This template is indexed based upon time and date. Received results from each airline are stored in individual templates 1416, 1418, 1420, 1422, 1424, and 1426. These templates are then stacked into a three-dimensional Cube 1414. The User Profile Database may dictate the order of the stacking. As an example, the Interface System may know that the user prefers to fly American Airlines, so its template is placed on top of the Cube 1414. The Interface System may also know that the user dislikes Southwest Airlines, and responds by marking their results as the least relevant. Accordingly, they are placed at the rear of the cube 1414.

Figure 12:
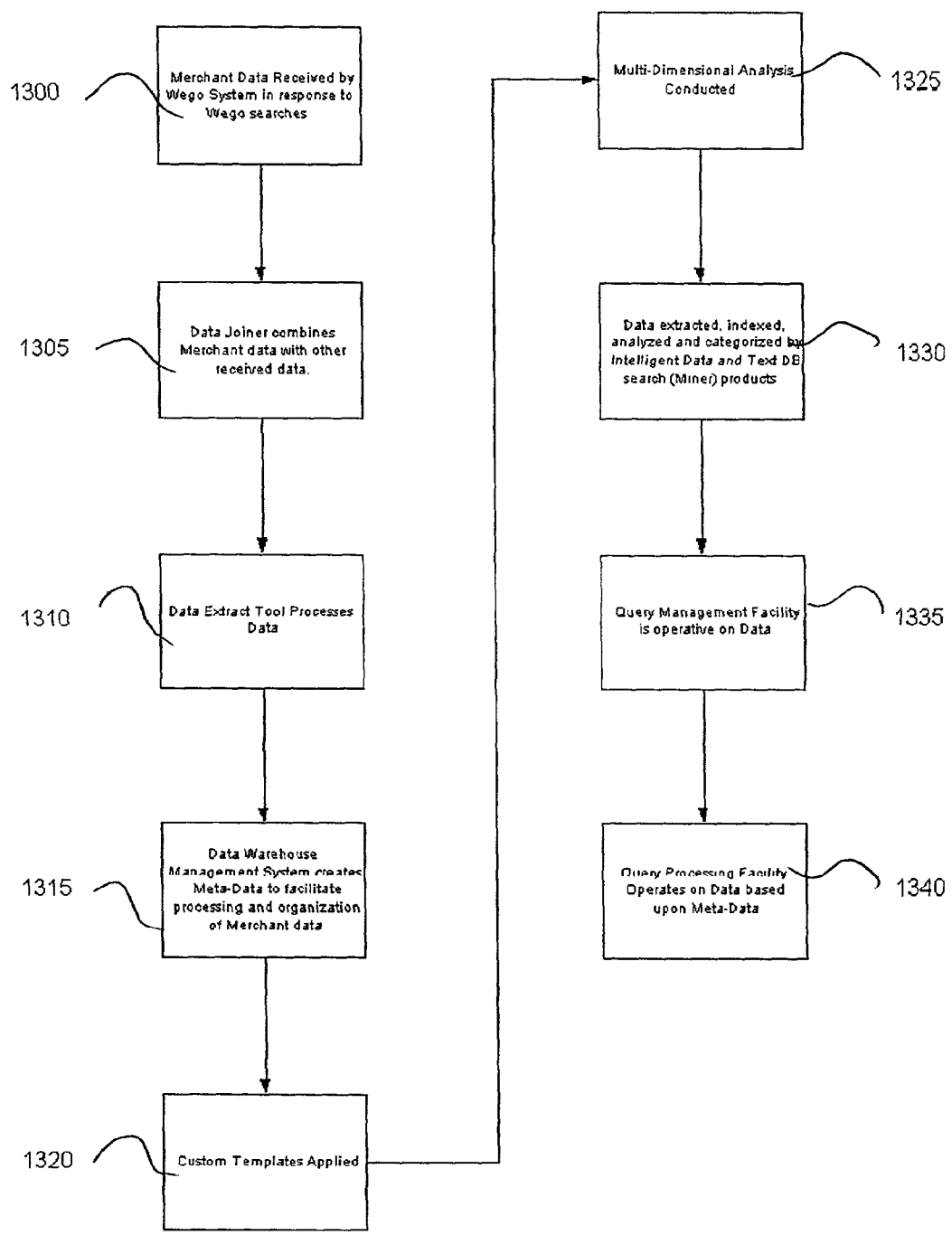
FIG. 12 illustrates an example of analyzing the Interface System Search Results in accordance with the present invention.

FIG. 12 is a flowchart illustrating an example data processing path. FIG. 12 is also an example of the placement of a multi-dimensional analysis function in a typical database management System. Illustratively, this database management System may be implemented through commercially available software products and customized by the Interface System where required.

In Step 1300, Merchant Data is received by the Interface System as a response to an Interface search. In Step 1300, a Data Joiner joins the received data with other data available from different database management systems. This may be necessary, because partners, merchants, or other data providers could possess different types of existing databases, such as those from Oracle, Microsoft, or IBM.

Next, a Data Extract Tool processes the data, in Step 1310. Illustratively, this Data Extract Tool may be ETI and Vality, which are supplied by Evolutionary Technologies International. This software may include Data Conversion Tools for defining data capture, cleanup, transformation applications, and Data System Libraries.

The received data is then processed by the Data Warehouse Management System, in Step 1315. This received data may contain Meta-Data used by administrators, and software tools for providing descriptions of data and operations. Meta Data is data describing the to-bestored data. Meta Data may be pre-existing, such as when data originates from a legacy database, or originated by the Database Management System, such as may be the case with newly gathered user activity data. Management software, such as Visual Warehouse by IBM would allow the administrators to use this Meta-data to help manage the warehouse.

In Steps 1320 and 1325, custom templates Multi-Dimensional analysis will then be applied to analyze and organize the received data. In Step 1330, intelligent Data and Text DB Search products such as IBM's Miner may then applied. These products extract, index, analyze, and categorize information from text and data sources such as documents, Web pages, survey forms, and the like.

In Step 1335, Query Management Facility (QMF) families of tools, including query, charting and reporting tools may be utilized to preserve the data for presentation. Examples of companies offering a suitable QMF product are Brio and Cognos. Finally, the Query Processing Facility operates on the processed data, in Step 1340. This Technology provides a SQL-driven facility that dynamically reads the Meta-data stored in database tables to determine if a change has occurred in the data, and whether any actions need to be taken in response to these changes.

Returning to the flowchart of FIG. 10, a privacy check in Step 1112 and a quality check in Step 1110 may be performed on the processed data. These ordered and processed responses may then be presented to the user in an Interface System designed GUI in Step 1106 in the form of a Report 1114.

6th Embodiment: E-Commerce
Application—Example: Travel Service Architecture

The Interface System is particularly suited for situations in which a variety of sources must be queried and reconciled in order to complete a user's compound request. An example of a compound request is a user's request for the Interface System to plan a trip or vacation. A vacation plan can be considered a compound request because a vacation plan may be comprised of multiple parts, (airline travel, hotel, rental car, restaurants, entertainment, and the like) which may be provided by multiple providers.

Figure 13:
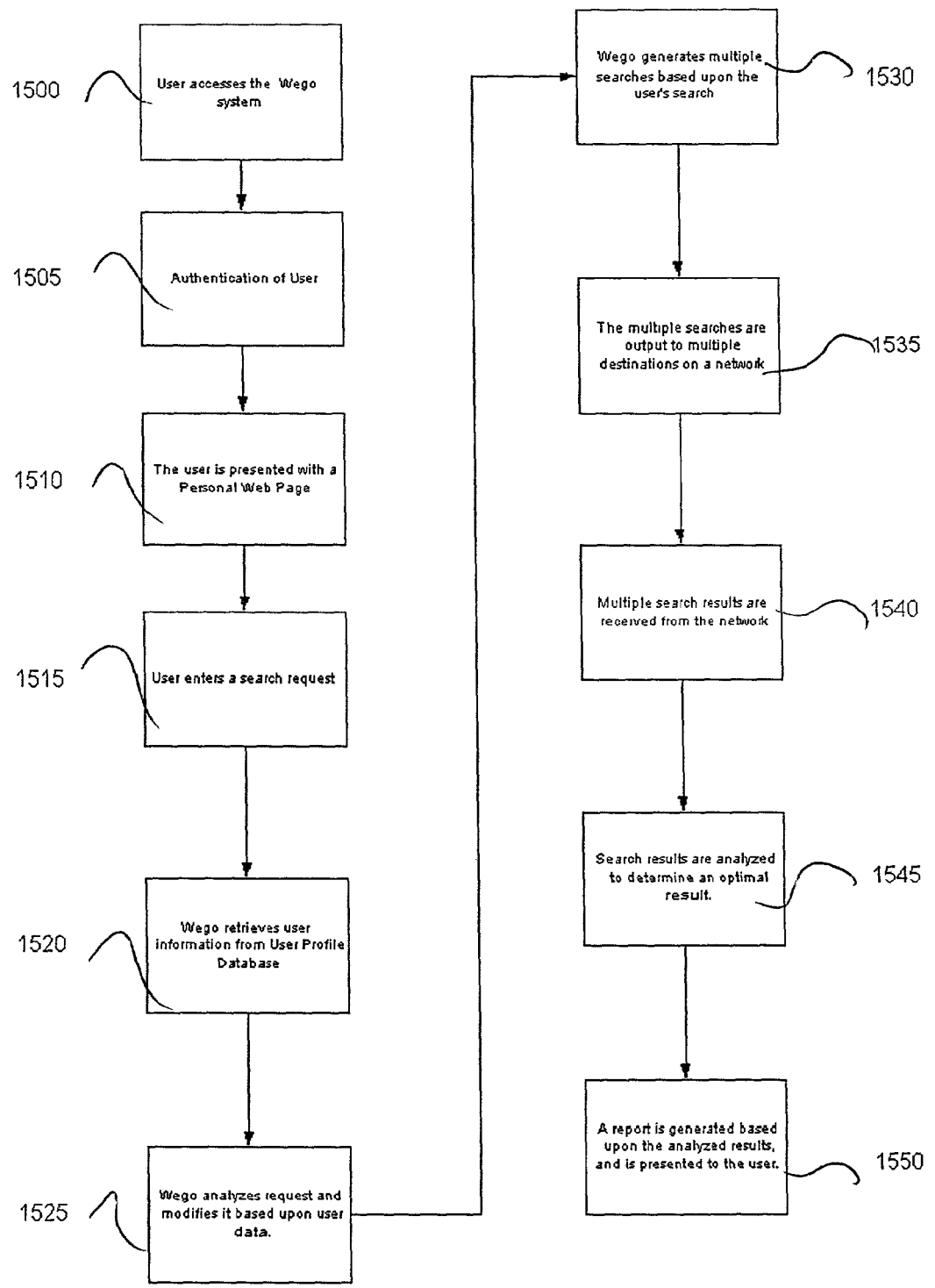
FIG. 13 illustrates an example of the "Travel Services" functionality in accordance with the present invention.

As shown in the illustrative flowchart of FIG. 13, the user first accesses the Interface System, in Step 1500. As discussed above, this access may occur through the use of a desktop Interface application, an Interface Web-site, the Web-site of an Interface partner, or another Interface access point. In Step 1505, the user may then be required to undergo an authentication procedure.

Once access has been granted the user may be presented with an Interface Personal Web page, in Step 1510. From this personal page, the user can enter a search request, in Step 1515. For example, the user may tell the Interface System that they wish to plan a trip from New York to California.

In Step 1520, the Interface System retrieves relevant User information from the User Profile Database and other Interface Databases. In Step 1525, the user's search request will then be analyzed and modified based upon the retrieved data. Continuing with the above example, the Interface System may know that the above user has a wife, two kids, and a dog. The Interface System may also know that the user has flown coach on Delta Airlines in the past, smokes, likes opera, and has an interest in sporty convertibles. The Interface System may modify the above search request to include some or all of this data, so that the results of this search will be tailored to the user. The Interface System may also generate recommendations based upon the user's profile and present these to the user. The user will then be given the opportunity to include these into the modified search. For example, the Interface System may recommend that the user postpone his trip due to poor weather conditions in California, or that the user take a different airline other than Delta Airlines due to a sale run by another airline.

In Step 1530, once the modified search has been developed, the Interface System can generate and format multiple searches, based upon this modified search. These multiple searches may be output to multiple destinations on a network, in Step 1535. A network database identifying locations on a network that may contain desired information might be employed to facilitate this distribution.

In Step 1540, the Interface System then receives multiple search results from the various network destination sites. The Interface System may then apply the information contained in the User Profile Database to analyze these results to determine which of the multiple results are optimal for the user, in Step 1545. In one embodiment a multidimensional analysis may be employed.

Finally, in Step 1550, a Travel Itinerary Report ("TIR") may be generated and presented to the user. The Interface System will present the content in the TIR to the User using a GUI specially designed for this application.

This GUI may contain a statement of the user's request. Search results, including trip times, dates, prices, and MPEG Photos, video, or audio illustrating those results, may be organized and presented to the user according to the information contained in the User Profile Database. The Interface GUI may also contain a section comparing various search results (e.g. airline prices, departure and arrival times, hotel prices, proximity to some location, and the like).

The TIR may also contain a suggestion section containing recommendations provided by the Interface System, and functionality to allow user's to fine-tune their request. These recommendations may be of places of interest to the user, or a statement of a travel option that the Interface System has determined is optimal for the user.

The Interface System travel services architecture may also handle bookings and confirmations, transaction security, payment transaction, and privacy management.

7th Embodiment—Peer-to-Peer Networks

The present invention may support at least two types of peer-to-peer services. A first type of peer-to-peer service, "true" peer-to-peer, distributes the functionality of the Interface System throughout the network. In this embodiment, some or all of the functionality of the Interface Server 170 is distributed to the computers of each user. The result of this distribution is that each user's computer contains a more complete implementation of the Interface System. This implementation may include related Interface databases.

Figure 14:
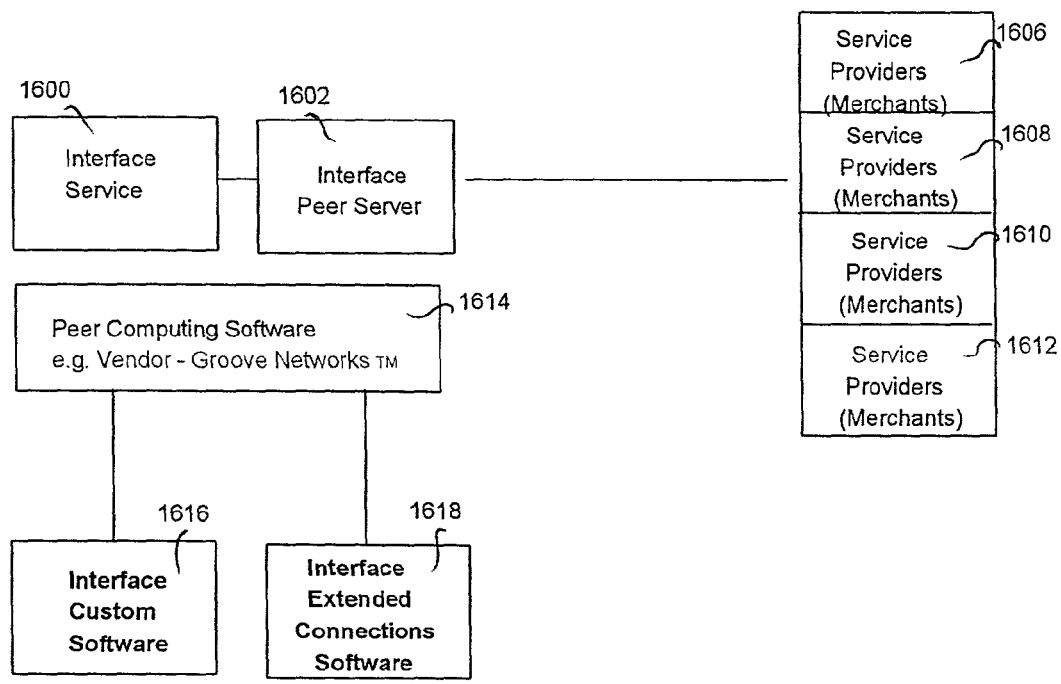
FIG. 14 illustrates an example of a peer-to-peer architecture in accordance with the present invention.

A second type of peer-to-peer service supported is pseudo peer-to-peer, whereby a peer-to-peer connection is established between a user and a second computer through a central server. The second computer may be a merchant, or a specialized computer that is part of the Interface System. This pseudo peer-to-peer connection is the same type of peer-to-peer connection that has been popularized by the Napster system. FIG. 14 illustrates a possible architecture for supporting the pseudo peer-to-peer service. A user accesses the Interface Service 1600 and connects to an Interface Peer Server 1602. As an example, the Peer Server 1602 may contain peer-to-peer computing software 1614, Interface Custom software 1616, and Interface Extended Communications Software 1618. Through the peer-to-peer server 1602, a peer-to-peer connection may be established between a user and one merchant 1608 from a plurality of merchants 1606, 1608, 1610, and 1612.

Merchants 1606, 1608, 1610, and 1612 may be required to register their availability for Peer Computing. Using management tools, the registration of peer-to-peer network members may be managed. In a preferred embodiment, these management tools should be scaleable, extensive, secure, and manageable in an enterprise environment. An example of such a tool is Groove 1.0, produced by Groove Networks, Inc.

The number of peer-to-peer networks and the types of services that these networks may support may be defined by the Interface software. Several inventive applications may be supported by the above-described peer-to-peer technologies. These inventive applications may be enabled through the development of customized Interface software 1616. Several of these inventive applications for the Interface System's peer-to-peer technology will be discussed in greater detail below.

8th Embodiment—Service Content—Rapid Refresh Software

In another embodiment of the present invention, the Interface System may take advantage of the collaboration and sharing aspects of peer-to-peer technology to enhance Interface Services. The Interface System may query, on regular or irregular time intervals, the current offerings, promotions, and specials available by merchants or other entities on the network. The Interface System will then update it own databases. This architecture improves the accuracy of data used in the Interface Services, and decreases the time required by the Interface System to reflect changes in network data.

9th Embodiment—Service Assistance Premium Service Software

In another embodiment of the present invention, the Interface System may allow an Interface Service operator to intervene on the behalf of the User of a premium service. The Interface operator may then intervene on the user's behalf, establishing a peer-to-peer connection with a Service Provider. This will result in a capability to fine-tune the retrieval of information. This configuration may also allow for collaboration between users and Interface operators to allow for the maximization of the Interface System networking experience.

10th Embodiment The Interface System Privacy Management Software

In a further embodiment, the present invention may be designed to comply with privacy policies of corporate partners. Additionally, the Interface System may offer its Users the ability to review any user information stored by the Interface System. The Interface software will manage the User request, establish an authentication procedure, and download the appropriate peer computing software to a user's personal computer. The Interface System then establishes a session where the User can review the data being stored on the Interface database in a secure setting.

11th Embodiment—Payment Support

Figure 15:
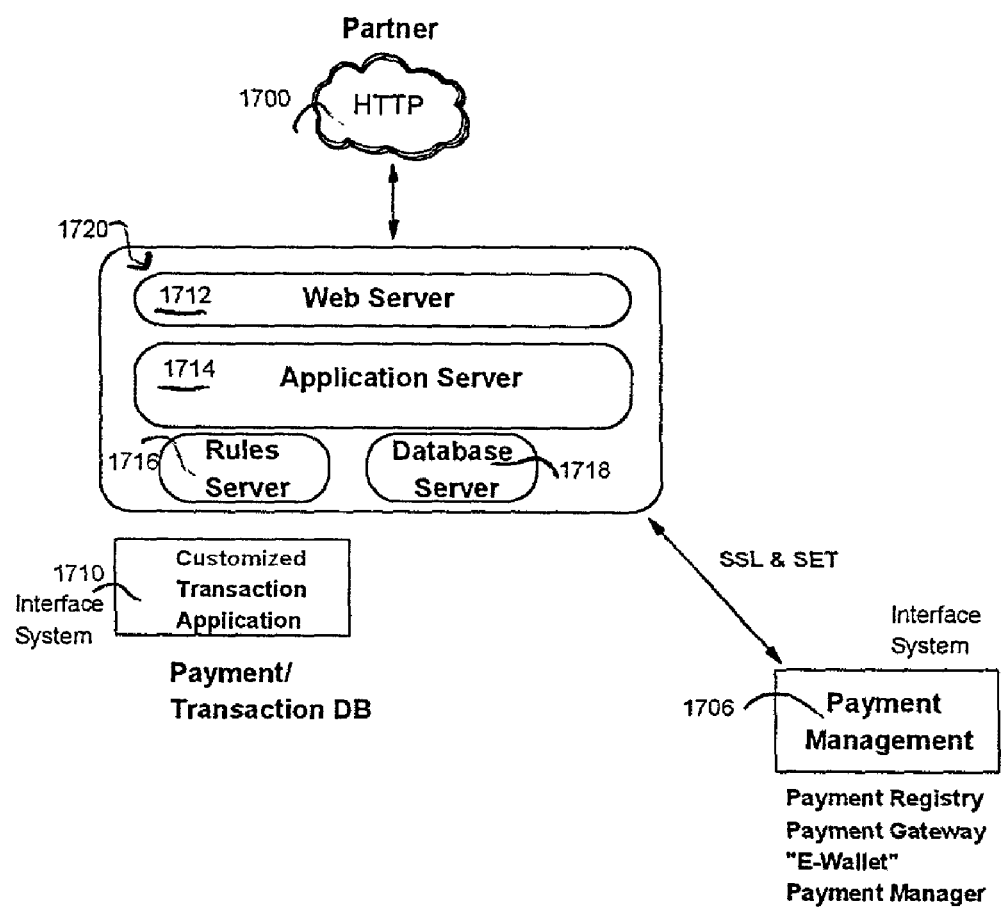
FIG. 15 illustrates an example of an embodiment of the Interface System to support payment/transaction analysis in accordance with the present invention.

In another embodiment of the present invention, the Interface System may be adapted to further support e-Commerce by incorporating a payment-processing functionality. FIG. 15 illustrates a possible configuration for a payment-processing architecture. Assume that a User has already used the Interface System to access a vendor through the Internet 17. As an example, the vendor's server may be comprised of a Web Server 1712, an Applications Server 1714, a Rules Server 1716, and a Database Server 1718. It is desirable for the vendor's server to also contain a Customized Interface Transactions Application 1710. Through this application 1710, the user can enter payment information in a secure environment. The Customized Interface Transaction Application 1710 will establish a connection with the Interface Payment Manager 1706. In one example, this connection may be a peer-to-peer connection. The Transaction Application 1710 will pass along the user's payment information to the Payment Manager 1706. The Payment Manager 1706 may process this information. In one example this payment information may be credit card information. The Payment Manager 1706 may respond to the vendor 1720 with an authorization approving the purchase.

Finally, the above-described embodiment of the invention is intended to be illustrative only. Numerous alternative embodiments may be devised by those having ordinary skill in the art without departing from the spirit and scope of the invention.

What is claimed is:

1. A apparatus for facilitating a personalized interface with a network, said apparatus comprising:
    a first input configured to receive request information from a user;
    a memory configured to store a user information database;
    a first processor to process said request information into at least one modified request based upon said user information database;
    an output configured to output said at least one modified request to said network; a second input configured to receive at least one response to said at least one modified request from said network;
    a second processor to process said at least one response into a modified response based upon said user information database; and
    a second output configured to output said modified response to said user.

2. The apparatus of claim 1 wherein said apparatus is a peer-to-peer (p2p) apparatus.

3. The apparatus of claim 1 further comprising: a second memory configured to store a network information database, wherein said network information database comprises a plurality of network site identifiers.

4. The apparatus of claim 1 further comprising: a third processor configured to generate an input interface, wherein said input interface is configured to receive said request information; and a third output configured to display said input interface.

5. The apparatus of claim 4 wherein said third processor is configured to generate said input interface based upon said user information database.

6. The apparatus of claim 4 wherein said memory is additionally configured to store a design template, and said third processor generates said input interface based upon said design template.

7. The apparatus of claim 4 wherein said input interface is comprised of at least one recommendation, wherein said at least one recommendation is generated based upon said user information database.

8. The apparatus of claim 4 wherein said input interface further comprises at least one pushed content.

9. The apparatus of claim 1 wherein said user information database comprises a user profile.

10. The apparatus of claim 1 wherein said user information database comprises at least one user preference.

11. The apparatus of claim 1 wherein said user information database comprises user behavior information.

12. The apparatus of claim 1 wherein said user information database comprises information gathered from at least one online source and at least one off-line source.

13. The apparatus of claim 1 wherein said modified response includes at least one recommendation, said recommendation being personalized to said user.

14. The apparatus of claim 13 further comprising: a third processor to generate said at least one recommendation based upon said user information database.

15. The apparatus of claim 1 further comprising: a third processor configured to create an input interface to said user to receive said request information; and a third output configured to display said input interface to said user.

16. The apparatus of claim 15 said input interface further comprising at least one recommendation, said recommendation being personalized to said user.

17. The apparatus of claim 15 wherein said input interface further comprises at least one pushed content.

18. The apparatus of claim 1 further comprising: a third processor configured generate an output interface based upon said user information database, where said output interface comprises said modified response; and a third output configured to display said output interface to said user.

19. The apparatus of claim 18 wherein said output interface further comprises at least one recommendation, said recommendation being personalized to said user.

20. The apparatus of claim 18 wherein said output interface further comprises at least one pushed content.

21. The apparatus of claim 1 further comprising: a third processor configured to generate a plurality of modified requests based upon said user information database.

22. The apparatus of claim 21 further comprising: a third output configured to output said plurality of modified requests to said network.

23. The apparatus of claim 22 wherein said plurality of modified requests are output to a plurality of search engines on said network, wherein each of said plurality of search engines processes said plurality of modified requests to generate said at least one response.

24. The apparatus of claim 23 further comprising: a fourth processor configured to format said plurality of modified requests to be compatible with said plurality of search engines.

25. The apparatus of claim 11 wherein said user behavior information comprises at least one on-line activity of said user.

26. The apparatus of claim 11 wherein said user behavior information comprises at least one off-line activity of said user.

27. The apparatus of claim 11 wherein said user behavior information is collected from at least one merchant.

28. The apparatus of claim 16 wherein said recommendations are pre-existing in said memory.

29. The apparatus of claim 19 wherein said recommendations are pre-existing in said memory.

30. The apparatus of claim 1 wherein said request information is a search request.

31. The apparatus of claim 1 wherein said request information is generated from a user activity.

32. The apparatus of claim 1 wherein said modified results are ordered according to a priority based upon said user information database.

33. The apparatus of claim 1 wherein said modified results are filtered based upon said user information database.

34. The apparatus of claim 1 further comprising: a third processor configured to generate an interface, wherein said interface is personalized to said user.

35. The apparatus of claim 34 wherein said third processor generates said interface based upon at least one connected network accessible by said interface.

36. The apparatus of claim 35 wherein said at least one connected network is the Internet.

37. The apparatus of claim 35 wherein said at least one connected network is a voice network.

38. The apparatus of claim 34 wherein said third processor generates said interface based upon an interface device displaying said interface.

39. The apparatus of claim 38 wherein said interface device is a Personal Digital Assistant (PDA).

40. The apparatus of claim 38 wherein said interface device is a computer.

41. The apparatus of claim 34 wherein said third processor re-generates said interface in response to a change in said user information database.

42. The apparatus of claim 41 further comprising: a third output configured to query said user as to whether or not to update said interface; and a third input configured to receive from said user an update instruction, wherein said third processor will only update said interface in response to said instruction.

43. A method for personalizing an interface with a network, said method comprising the steps of: (a) receiving request information from a user; (b) interfacing with a user information database; (c) processing said request information into at least one modified request based on said user information database; (d) processing said at least one modified request on said network; (e) receiving at least one response to said at least one modified request from said network; (f) processing said at least one response into at least one modified response using said user information database; and (g) outputting said at least one modified response to said user.

44. The method of claim 43 further comprising the steps of: (h) creating an input interface based upon said user information database to receive said request information from said user; and (i) displaying said input interface to said user.

45. The method of claim 44 said input interface further comprising at least one recommendation, said recommendation being personalized to said user.

46. The method of claim 45 wherein said step of processing said at least one modified request comprises the step of (d1) outputting said at least one modified request onto said network based on a network information database, wherein said database comprises a plurality of network site identifiers.

47. The method of claim 43 wherein said user information database comprises a user profile.

48. The method of claim 43 wherein said user information database comprises at least one user preference.

49. The method of claim 43 wherein said user information database comprises user behavior information.

50. The method of claim 43 wherein said user information database comprises information gathered from at least one on-line source and at least one off-line source.

51. The method of claim 43 wherein said modified response includes at least one recommendation, said recommendation being personalized to said user.

52. The method of claim 51 further comprising the step of: (h) generating said at least one recommendation based upon said user information database.

53. The method of claim 52 said input interface further comprising at least one pushed content.

54. The method of claim 43 further comprising the steps of: (h) generating an output interface based upon said user information database, where said output interface comprises said modified response; and (i) displaying said output interface to said user.

55. The method of claim 54 said output interface further comprised of at least one recommendation, said recommendation being personalized to said user.

56. The method of claim 54 said output interface further comprising at least one pushed content.

57. The method of claim 43 further comprising the step of: (h) generating a plurality of modified requests based upon said user information database.

58. The method of claim 57 further comprising the step of: (i) outputting said plurality of modified requests to said network based upon said network information database.

59. The method of claim 58 further comprising the step of: (j) outputting said plurality of modified requests to a plurality of search engines on said network based upon said network information profile.

60. The method of claim 59 further comprising the step of: (k) formatting said plurality of modified requests to be compatible with said plurality of search engines.

61. The method of claim 48 wherein said user behavior information comprises at least one on-line activity of said user.

62. The method of claim 48 wherein said user behavior information comprises at least one off-line activity of said user.

63. The method of claim 48 wherein said user behavior information is collected from at least one merchant.

64. The method of claim 55 wherein said recommendations are pre-existing in said memory in said memory.

65. The method of claim 52 wherein said recommendations are pre-existing in said memory in said memory.

66. The method of claim 43 wherein said request information is a search request.

67. The method of claim 43 further comprising the step of: (h) generating said request information from a user activity.

68. The method of claim 43 further comprising the step of: (h) ordering a plurality of responses based upon a priority assigned to each response of said plurality of responses based upon said user information database.

69. The method of claim 43 further comprising the step of: (h) filtering said modified results based upon said user information database.

70. The method of claim 43 further comprising the step of: (h) processing a payment from said user, wherein said payment comprises payment information.

71. The method of claim 70 wherein said processing step further comprises the steps of: (h1) forwarding said payment information to a financial institution; and (i) forwarding said payment information to an Internet Service Provider.

72. The method of claim 71 wherein said financial institution is at least one of a credit card company and Internet Service Provider.

73. The method of claim 43 wherein said step of processing said at least one response further comprises the step of: (f1) formatting said at least one response into an array (f2) analyzing said array to generate said at least one modified response.

74. The method of claim 43 further comprising the step of: (h) generating an interface, wherein said interface is personalized to said user.

75. The method of claim 74 wherein said step of generating said interface is based upon at least one connected network accessible by said interface.

76. The method of claim 75 wherein said at least one connected network is the Internet.

77. The method of claim 75 wherein said at least one connected network is a voice network.

78. The method of claim 74 wherein said step of generating said interface is based upon an interface device displaying said interface.

79. The method of claim 78 wherein said interface device is a Personal Digital Assistant (PDA).

80. The method of claim 78 wherein said interface device is a computer.

81. The method of claim 74 further comprising the step of: (i) re-generating said interface in response to a change in said user information database.

82. The method of claim 81 further comprising the steps of: (j) querying said user as to whether or not to update said interface; and (k) receiving from said user an update instruction, wherein said step of re-generating will only occur in response to said instruction.

83. A system for personalizing an interface with a network, said system comprising: a local interface, said local interface having a first local input to receive request information from a user, a local output configured to output said request information to a remote server, and a second local input configured to receive a modified response from said remote server; and a remote interface including said remote server, said remote interface having a first remote server input configured to receive said request information from said local interface, a memory configured to store a user information database, a first processor configured to process said request information into at least one modified request based upon said user information database, a first remote server output configured to output said at least one modified request to said network, a second remote server input configured to receive at least one response from said network, a second processor configured to process said at least one response into said modified response based upon said user information database, and a second remote server output configured to output said modified response to said local interface.

84. The system of claim 83, wherein said remote interface further including a second memory configured to store a network information database, wherein said network information database comprises a plurality of site identifiers.

85. The system of claim 83 wherein said user information database comprises a user profile.

86. The system of claim 83 wherein said user information database comprises at least one user preference.

87. The system of claim 83 wherein said user information database comprises user behavior information.

88. The system of claim 83 wherein said user information database comprises information gathered from at least one on-line source and at least one off-line source.

89. The system of claim 83 wherein said modified response includes at least one recommendation, said recommendation being personalized to said user.

90. The system of claim 89 wherein said remote server further comprises a third processor configured to generate said at least one recommendation based upon said user information database.

91. The system of claim 83 wherein said remote server further comprises a third processor configured to create an input interface to said user to receive said request information; and wherein said local interface further comprises a second local interface output configured to display said input interface to said user.

92. A server for supporting the personalized interface of a user with a network, said server comprising: a first input configured to receive said request information from a local interface; a memory configured to store a user information database; a first processor configured to process said request information into at least one modified request based upon said user information database; a first output configured to output said at least one modified request to said network; a second input configured to receive at least one response from said network; a second processor configured to process said at least one response into said modified request response based upon said user information database; and a second output configured to output said modified request response to said local interface.

93. The server of claim 92 said input interface further comprising at least one recommendation, said recommendation being personalized to said user.

94. The system of claim 83 wherein said remote server further comprises a third processor configured to create an output interface to said user to receive said request information; and wherein said local interface further comprises a second local interface output configured to display said input interface to said user.

95. The system of claim 94 wherein said output interface further comprises at least one recommendation, said recommendation being personalized to said user.

96. The system of claim 94 wherein said output interface further comprises at least one pushed content.

97. The system of claim 83 wherein said remote server further comprises a third processor configured to generate a plurality of modified requests.

98. The system of claim 97 wherein said remote server further comprises a third remote server output configured to output said plurality of modified requests to said network.

99. The system of claim 98 wherein said plurality of modified requests are output to a plurality of search engines on said network, wherein each of said plurality of search engines processes said plurality of modified requests to generate said at least one response.

100. The system of claim 99 wherein said remote server further comprises a fourth processor configured to format said plurality of modified requests to be compatible with said plurality of search engines.

101. The system of claim 87 wherein said user behavior information comprises at least one on-line activity of said user.

102. The system of claim 87 wherein said user behavior information comprises at least one off-line activity of said user.

103. The system of claim 87 wherein said user behavior information is collected from at least one merchant.

104. The server of claim 93 wherein said recommendations are pre-existing in said memory in said memory.

105. The system apparatus of claim 95 wherein said recommendations are pre-existing in said memory in said memory.

106. The system of claim 83 wherein said request information is a search request.

107. The system of claim 83 wherein said request information is generated from a user activity.

108. The system of claim 83 wherein said modified results are ordered according to a priority based upon said user information database.

109. The system of claim 83 wherein said modified results are filtered based upon said user information database.

110. The server of claim 92 wherein said input interface further comprises at least one pushed content.

111. The server of claim 92 further comprising: a second memory configured to store a network information database, wherein said network information database comprises a plurality of network site identifiers.

112. The server of claim 92 wherein said user information database comprises a user profile.

113. The server of claim 92 wherein said user information database comprises at least one user preference.

114. The server of claim 92 wherein said user information database comprises user behavior information.

115. The server of claim 92 wherein said user information database comprises information gathered from at least one on-line source and at least one off-line source.

116. The server of claim 92 wherein said modified response includes at least one recommendation, said recommendation being personalized to said user.

117. The server of claim 116 further comprising: a third processor to generate said at least one recommendation based upon said user information database.

118. The server of claim 92 further comprising: a third processor configured to create an input interface to said user to receive said request information; and a third output configured to display said input interface to said user.

119. An apparatus for personalizing an interface with a remote server to retrieve content from a network, said apparatus comprising: a first input for receiving request information from a user; an output for outputting said request information to said remote server, wherein said remote server comprises a first remote server input configured to receive said request information from said apparatus, a memory configured to store a user information database, a first processor configured to process said request information into at least one modified request based upon said user information database, a first remote server output configured to output said at least one modified request to said network, a second remote server input configured to receive at least one response from said network, a second processor configured to process said at least one response into said modified request response based upon said user information database, and a second remote server output configured to output said modified request response to said local interface; a second input for receiving a modified request response from said remote server; and a second output for outputting said modified request response to said user.

120. The apparatus of claim 119 said input interface further comprising at least one recommendation, said recommendation being personalized to said user.

121. The server of claim 92 further comprising: a third processor configured generate an output interface based upon said user information database, where said output interface comprises said modified response; and a third output configured to display said output interface to said user.

122. The server of claim 121 wherein said output interface further comprises at least one recommendation, said recommendation being personalized to said user.

123. The server of claim 121 wherein said output interface further comprises at least one pushed content.

124. The server of claim 92 further comprising: a third processor configured to generate a plurality of modified requests.

125. The server of claim 124 further comprising: a third output configured to output said plurality of modified requests to said network.

126. The server of claim 125 wherein said plurality of modified requests are output to a plurality of search engines on said network, wherein each of said plurality of search engines processes said plurality of modified requests to generate said at least one response.

127. The server of claim 126 further comprising: a fourth processor configured to format said plurality of modified requests to be compatible with said plurality of search engines.

128. The server of claim 114 wherein said user behavior information comprises at least one on-line activity of said user.

129. The server of claim 114 wherein said user behavior information comprises at least one off-line activity of said user.

130. The server of claim 114 wherein said user behavior information is collected from a at least one merchant.

131. The apparatus of claim 120 wherein said recommendations are pre-existing in said memory.

132. The server of claim 122 wherein said recommendations are pre-existing in said memory.

133. The server of claim 92 wherein said request information is a search request.

134. The server of claim 92 wherein said request information is generated from a user activity.

135. The server of claim 92 wherein said modified results are ordered according to a priority based upon said user information database.

136. The server of claim 92 wherein said modified results are filtered based upon said user information database.

137. The apparatus of claim 119 wherein said input interface further comprises at least one pushed content.

138. The apparatus of claim 119, wherein said remote server further comprises a second memory configured to store a network information database, wherein said network information database comprises a plurality of network site identifiers.

139. The apparatus of claim 119 wherein said user information database comprises a user profile.

140. The apparatus of claim 119 wherein said user information database comprises at least one user preference.

141. The apparatus of claim 119 wherein said user information database comprises user behavior information.

142. The apparatus of claim 119 wherein said user information database comprises information gathered from at least one on-line source and at least one off-line source.

143. The apparatus of claim 119 wherein said modified response includes at least one recommendation, said recommendation being personalized to said user.

144. The apparatus of claim 143 wherein said remote server further comprises a third processor to generate said at least one recommendation based upon said user information database.

145. The apparatus of claim 119 wherein said remote server further comprises a third processor configured to create an input interface to said user to receive said request information, and a third output configured to display said input interface to said user.

146. A media including a software application for use on a computer to interface with a network, said software application comprising: a first routine configured to receive request information from a user; a second routine configured to process said request information into at least one modified request based upon a user information database; a third routine configured to output said at least one modified request to said network; a fourth routine configured to generate multiple targeted web searches; a fifth routine configured to receive at least one response to said at least one modified request from said network; a sixth routine configured to process said at least one response into a modified response based upon said user information database; and a seventh routine configured to output said modified response to said user.

147. The media of claim 146 wherein said input interface comprises at least one recommendation, said recommendation being personalized to said user.

148. The apparatus of claim 119 wherein said remote server further comprises a third processor configured generate an output interface based upon said user information database, wherein said output interface comprises said modified response, and wherein said apparatus further comprising: a third output configured to display said output interface to said user.

149. The apparatus of claim 148 wherein said output interface further comprises at least one recommendation, said recommendation being personalized to said user.

150. The apparatus of claim 148 wherein said output interface further comprises at least one pushed content.

151. The apparatus of claim 148 further comprising: a third processor configured to generate a plurality of modified requests.

152. The apparatus of claim 151 wherein said remote server further comprises a third remote server output configured to output said plurality of modified requests to said network.

153. The apparatus of claim 152 wherein said plurality of modified requests are output to a plurality of search engines on said network, wherein each of said plurality of search engines processes said plurality of modified requests to generate said at least one response.

154. The apparatus of claim 153 further comprising: a fourth processor configured to format said plurality of modified requests to be compatible with said plurality of search engines.

155. The apparatus of claim 141 wherein said user behavior comprises at least one on-line activity of said user.

156. The apparatus of claim 141 wherein said user behavior comprises at least one off-line activity of said user.

157. The apparatus of claim 141 wherein said user behavior is collected from at least one merchant.

158. The media of claim 147 wherein said recommendations are pre-existing in said memory.

159. The apparatus of claim 149 wherein said recommendations are pre-existing in said memory.

160. The apparatus of claim 119 wherein said request information is a search request.

161. The apparatus of claim 119 wherein said request information is generated from a user activity.

162. The apparatus of claim 119 wherein said modified results are ordered according to a priority based upon said user information database.

163. The apparatus of claim 119 wherein said modified results are filtered based upon said user information database.

164. The media of claim 146 wherein said input interface further comprises of at least one pushed content.

165. The software application of claim 146 wherein said third routine outputs said at least one modified request to said network based on a network information database, wherein said database comprises a plurality of network site identifiers.

166. The software application of claim 146 wherein said user information database comprises a user profile.

167. The software application of claim 146 wherein said user information database comprises at least one user preference.

168. The software application of claim 146 wherein said user information database comprises user behavior information.

169. The software application of claim 146 wherein said user information database comprises information gathered from at least one on-line source and at least one off-line source.

170. The software application of claim 146 wherein said modified response includes at least one recommendation, said recommendation being personalized to said user.

171. The software application of claim 170 further comprising: an eighth routine configured to generate said at least one recommendation based upon said user information database.

172. The software application of claim 146 further comprising: a seventh routine configured to create an input interface to said user to receive said request information; and a ninth routine configured to display said input interface to said user.

173. The software application of claim 172 said input interface further comprising at least one recommendation, said recommendation being personalized to said user.

174. The software application of claim 172 wherein said input interface further comprises at least one pushed content.

175. The software application of claim 146 further comprising: an eighth routine configured generate an output interface based upon said user information database, where said output interface comprises said modified response; and a ninth routine configured to display said output interface to said user.

176. The software application of claim 175 wherein said output interface further comprises at least one recommendation, said recommendation being personalized to said user.

177. The software application of claim 175 wherein said output interface further comprises at least one pushed content.

178. The software application of claim 146 further comprising: a seventh routine configured to generate a plurality of modified requests.

179. The software application of claim 178 further comprising: an eighth routine configured to output said plurality of modified requests to said network.

180. The software application of claim 179 wherein said plurality of modified requests are output to a plurality of search engines on said network, wherein each of said plurality of search engines processes said plurality of modified requests to generate said at least one response.

181. The software application of claim 180 further comprising: a tenth routine configured to format said plurality of modified requests to be compatible with said plurality of search engines.

182. The software application of claim 166 wherein said user behavior information comprises at least one on-line activity of said user.

183. The software application of claim 166 wherein said user behavior information comprises at least one off-line activity of said user.

184. The software application of claim 166 wherein said User behavior information is collected from at least one merchant.

185. The software application of claim 173 wherein said recommendations are pre-existing in said memory.

186. The software application of claim 146 wherein said request information is a search request.

187. The software application of claim 146 wherein said request information is generated from a user activity.

188. The software application of claim 146 further comprising: an eighth routine configured to order said modified results according to a priority based upon said user information database.

189. The software application of claim 146 further comprising: an eighth routine configured to filter said modified results based upon said user information database.

190. The software application of claim 189 further comprising: a ninth routine configured to generate an output interface based upon said user information database, where said output interface comprises said modified response; and a tenth routine configured to display said output interface to said user.

191. The software application of claim 146 further comprising: a first-time user routine, prior to said first routine, configured to collect user information, to generate a user profile, and to generate a personalized web page.

192. A apparatus for facilitating a personalized interface with a network, said apparatus comprising:
 a user information database storing in computer memory user information about a user;
 a first input configured to receive request information from said user;
 at least one processor to process said request information into at least one modified request based upon said user information;
 an output configured to output said at least one modified request to said network;
 a second input configured to receive at least one response to said at least one modified request from said network;
 said at least one processor to process said at least one response into a modified response based upon said user information; and
 a second output configured to output said modified response to said user; and
 wherein said user information stored in user information database comprises at least one of user preference information about the user, user behavior information about the user, and user profile information about the user.

193. The apparatus of claim 192 wherein said user information stored in said user information database comprises user preference information.

194. The apparatus of claim 192 wherein said user information stored in said user information database comprises user behavior information.

195. The apparatus of claim 192 wherein said user information stored in said user information database includes at least one of travel profile information, travel preference information, and travel behavior information.

196. The apparatus of claim 192 wherein said user information stored in said user information database includes at least one of airline travel profile information, airline travel preference information, and airline travel behavior information.

197. A computer network implemented method for facilitating a personalized interface with a network, said method comprising:
 storing in a user information database in computer memory user information about a user;
 receiving request information from said user;
 processing said request information into at least one modified request based upon said user information;
 configuring an output to output said at least one modified request to said network;
 receiving at least one response to said at least one modified request from said network;
 processing said at least one response into a modified response based upon said user information; and
 outputting said modified response to said user; and
 wherein said user information stored in user information database comprises at least one of user preference information about the user, user behavior information about the user, and user profile information about the user.

198. The method of claim 197 wherein said user information stored in said user information database comprises user preference information.

199. The method of claim 197 wherein said user information stored in said user information database comprises user behavior information.

200. The method of claim 197 wherein said user information stored in said user information database includes at least one of travel profile information, travel preference information, and travel behavior information.

201. The method of claim 197 wherein said user information stored in said user information database includes at least one of airline travel profile information, airline travel preference information, and airline travel behavior information.

202. The software application of claim 176 wherein said recommendation is pre-existing in said memory.

* * * * *

UNITED STATES PATENT AND TRADEMARK OFFICE
CERTIFICATE OF CORRECTION

PATENT NO. : 7,788,212 B2  Page 1 of 1
APPLICATION NO. : 09/946157
DATED : August 31, 2010
INVENTOR(S) : Beckmann et al.

It is certified that error appears in the above-identified patent and that said Letters Patent is hereby corrected as shown below:

In column 16 lines 26-30 reading: "18. The apparatus of claim 1 further comprising: a third processor configured generate an output interface based upon said user information database, where said output interface comprises said modified response; and a third output configured to display said output interface to said user." should read:

-- 18. The apparatus of claim 1 further comprising: a third processor configured to generate an output interface based upon said user information database, where said output interface comprises said modified response; and a third output configured to display said output interface to said user. --

In column 18 lines 37-38 reading: "64. The method of claim 55 wherein said recommendations are pre-existing in said memory in said memory." should read:

-- 64. The method of claim 55 wherein said recommendations are pre-existing in said memory. --

In column 18 lines 39-40 reading: "65. The method of claim 52 wherein said recommendations are pre-existing in said memory in said memory." should read:

-- 65. The method of claim 52 wherein said recommendations are pre-existing in said memory. --

Signed and Sealed this

Twenty-third Day of November, 2010

David J. Kappos
*Director of the United States Patent and Trademark Office*

UNITED STATES PATENT AND TRADEMARK OFFICE
CERTIFICATE OF CORRECTION

PATENT NO. : 7,788,212 B2  
APPLICATION NO. : 09/946157  
DATED : August 31, 2010  
INVENTOR(S) : Beckmann et al.

Page 1 of 2

It is certified that error appears in the above-identified patent and that said Letters Patent is hereby corrected as shown below:

In column 16 lines 26-30 reading: "18. The apparatus of claim 1 further comprising: a third processor configured generate an output interface based upon said user information database, where said output interface comprises said modified response; and a third output configured to display said output interface to said user." should read:

-- 18. The apparatus of claim 1 further comprising: a third processor configured to generate an output interface based upon said user information database, where said output interface comprises said modified response; and a third output configured to display said output interface to said user. --

In column 18 lines 37-38 reading: "64. The method of claim 55 wherein said recommendations are pre-existing in said memory in said memory." should read:

-- 64. The method of claim 55 wherein said recommendations are pre-existing in said memory. --

In column 18 lines 39-40 reading: "65. The method of claim 52 wherein said recommendations are pre-existing in said memory in said memory." should read:

-- 65. The method of claim 52 wherein said recommendations are pre-existing in said memory. --

In column 20 lines 56-57 reading: "104. The server of claim 93 wherein said recommendations are pre-existing in said memory in said memory." should read:

-- 104. The server of claim 93 wherein said recommendations are pre-existing in said memory. --

In column 20 lines 58-60 reading: "105. The system apparatus of claim 95 wherein said recommendations are pre-existing in said memory in said memory." should read:

This certificate supersedes the Certificate of Correction issued November 23, 2010.

Signed and Sealed this
First Day of February, 2011

David J. Kappos
*Director of the United States Patent and Trademark Office*

CERTIFICATE OF CORRECTION (continued)
U.S. Pat. No. 7,788,212 B2

-- 105. The system apparatus of claim 95 wherein said recommendations are pre-existing in said memory. --

In column 21 lines 52-56 reading: "121. The server of claim 92 further comprising: a third processor configured generate an output interface based upon said user information database, where said output interface comprises said modified response; and a third output configured to display said output interface to said user." should read:

-- 121. The server of claim 92 further comprising: a third processor configured to generate an output interface based upon said user information database, where said output interface comprises said modified response; and a third output configured to display said output interface to said user. --

In column 22 lines 16-17 reading: "130. The server of claim 114 wherein said user behavior information is collected from a at least one merchant." should read:

-- 130. The server of claim 114 wherein said user behavior information is collected from at least one merchant. --